(12) United States Patent
Su

(10) Patent No.: US 10,949,664 B2
(45) Date of Patent: Mar. 16, 2021

(54) OPTICAL CHARACTER RECOGNITION TRAINING DATA GENERATION FOR NEURAL NETWORKS BY PARSING PAGE DESCRIPTION LANGUAGE JOBS

(71) Applicant: KYOCERA Document Solutions Inc., Osaka (JP)

(72) Inventor: Dongpei Su, Palos Verdes Estates, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 137 days.

(21) Appl. No.: 16/378,470

(22) Filed: Apr. 8, 2019

(65) Prior Publication Data

US 2020/0320289 A1    Oct. 8, 2020

(51) Int. Cl.
*G06K 9/00* (2006.01)
*G06F 17/30* (2006.01)
(Continued)

(52) U.S. Cl.
CPC ......... *G06K 9/00456* (2013.01); *G06K 9/344* (2013.01); *G06K 9/6256* (2013.01);
(Continued)

(58) Field of Classification Search
USPC ........ 382/100, 103, 112, 156, 162, 172–173, 382/181, 190, 200, 209, 219, 224, 254,
(Continued)

(56) References Cited

U.S. PATENT DOCUMENTS

| 7,013,309 | B2 | 3/2006 | Chakraborty et al. |
| 2010/0150448 | A1* | 6/2010 | Lecerf ................ G06K 9/2072 382/190 |

(Continued)

FOREIGN PATENT DOCUMENTS

JP    2004227255    8/2004

OTHER PUBLICATIONS

Seol-Ki Baek et al., "CVPR 2018 Review", Aug. 17, 2018.
(Continued)

*Primary Examiner* — Seyed H Azarian
(74) *Attorney, Agent, or Firm* — GrowIP Law Group LLC

(57) ABSTRACT

Methods and apparatus for training and utilizing an artificial neural network (ANN) are provided. A computing device can receive training documents including text. The computing device can parse the training documents to determine training data items. Each training data item can include a training label related to text within the training documents and location information indicating a location of text related to the training label. An ANN can be trained to recognize text using the training data items and training input that includes the training documents. After training the ANN, a request to predict text in application documents that differ from the training documents can be received. The application documents can include second text. A prediction of the second text can be determined by applying the trained ANN to the application documents. After determining the prediction of the second text, information related to the second text can be provided.

16 Claims, 8 Drawing Sheets

(51) Int. Cl.
G06K 9/62 (2006.01)
G06N 3/08 (2006.01)
G06T 11/20 (2006.01)
G06K 9/34 (2006.01)

(52) U.S. Cl.
CPC .............. *G06N 3/084* (2013.01); *G06T 11/20* (2013.01); *G06K 2209/01* (2013.01); *G06T 2210/12* (2013.01)

(58) Field of Classification Search
USPC ........ 382/276, 286, 305, 321, 176; 707/737, 707/748
See application file for complete search history.

(56) References Cited

U.S. PATENT DOCUMENTS

| 2013/0226935 | A1* | 8/2013 | Bai ..................... G06N 20/00 707/748 |
| 2019/0147103 | A1* | 5/2019 | Bhowan ............... G06F 16/353 707/737 |
| 2019/0188463 | A1* | 6/2019 | Sodhani ................ G06N 3/084 |
| 2020/0151503 | A1* | 5/2020 | Wang .................... G06K 9/6256 |
| 2020/0193153 | A1* | 6/2020 | Lee ...................... G06F 40/226 |

OTHER PUBLICATIONS

A. Graves et al., "Connectionist Temporal Classification: Labelling Unsegmented Sequence Data with Recurrent Neural Networks", Proceedings of the 23rd International conference on Machine Learning, Jun. 25, 2006, pp. 369-376.

T. He et al., "An End-to-End TextSpotter with Explicit Alignment and Attention", 2018 IEEE/CVF Conference on Computer Vision and Pattern Recognition, Jun. 18, 2018, pp. 5020-5029.

R. Johnson et al., "Deep Pyramid Convolutional Neural Networks for Text Categorization", Proceedings of the 55th Annual Meeting of the Association for Computational Linguistics, Jul. 30, 2017, vol. 1, pp. 562-570.

A. Karpathy, "Convolutional Neural Networks (CNNs / ConvNets)", Apr. 8, 2015, available via the Internet at web.archive.org/web/20190408014552/https://cs231n.github.io/convolutional-networks/ (last visited Apr. 8, 2019).

M. Liao et al, "Rotation-sensitivity Regression for Oriented Scene Text Detection", Jun. 18, 2018, 2018 IEEE/CVF Conference on Computer Vision and Pattern Recognition (CVPR), pp. 5909-5918.

J. Long et al., "Fully Convolutional Networks for Semantic Segmentation", Mar. 8, 2015, available via the Internet at arxiv.org/pdf/1411.4038.pdf (last visited Apr. 8, 2019).

S. Long et al., "Scene Text Detection and Recognition: The Deep Learning Era", Dec. 22, 2018, available via the Internet at arxiv.org/pdf/1811.04256.pdf (last visited Apr. 8, 2019).

M. Nielsen, "Using neural nets to recognize handwritten digits", Oct. 2018, available via the Internet at neuralnetworksanddeeplearning.com/chap1.html (last visited Apr. 8, 2019).

R. Parmar, "Detection and Segmentation through ConvNets", Sep. 1, 2018, available via the Internet at towardsdatascience.com/detection-and-segmentation-through-convnets-47aa42de27ea (last visited Apr. 8, 2019).

Skymind, Inc.,"A Beginner's Guide to Attention Mechanisms and Memory Networks", Mar. 1, 2019, available via the Internet at web.archive.org/web/20190301082355/https://skymind.ai/wiki/attention-mechanism-memory-network (last visited Apr. 8, 2019).

The Wikimedia Foundation, "Machine learning", Mar. 8, 2019, available via the Internet at en.wikipedia.org/w/index.php?title=Machine_learning&oldid=886780793 (last visited Apr. 8, 2019).

* cited by examiner

US 10,949,664 B2

OPTICAL CHARACTER RECOGNITION TRAINING DATA GENERATION FOR NEURAL NETWORKS BY PARSING PAGE DESCRIPTION LANGUAGE JOBS

BACKGROUND

Printing devices have increased in number and geographic footprint throughout the world and have become increasingly connected to networks. The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Some printing devices have optical character recognition (OCR) functionality. Optical character recognition involves converting typed or printed text into machine-encoded text, often from a scanned document or a photo of a document. It is a commonly used tool for electronic data entry in numerous applications. Traditional optical character recognition includes techniques such as pattern matching, image correlation, glyph decomposition, and feature detection. Extensive human engineering can be utilized to isolate input glyphs in text, and to design glyph features.

SUMMARY

In a first aspect, a method for training and utilizing an artificial neural network (ANN) is provided. A computing device receives training documents including text. The computing device parses the training documents to determine a plurality of training data items. Each training data item of the plurality of training data items includes a training label related to text within the training documents and location information indicating a location of text within the training documents that is related to the training label. An ANN is trained to recognize text in documents using the plurality of training data items and training input, where the training input includes the training documents. After training the ANN, a request to predict text in application documents that differ from the training documents is received, where the application documents include second text. A prediction of the second text is determined by applying the trained ANN to the application documents. After determining the prediction of the second text, information related to the second text is provided as output.

In a second aspect, a computing device is provided. The computing device includes one or more processors; and non-transitory data storage. The non-transitory data storage stores at least computer-readable instructions that, when executed by the one or more processors, cause the computing device to perform tasks. The tasks include: receiving training documents including text; parsing the training documents to determine a plurality of training data items, each training data item of the plurality of training data items including a training label related to text within the training documents and location information indicating a location of text within the training documents that is related to the training label; training an ANN to recognize text in documents using the plurality of training data items and training input, the training input including the training documents; after training the ANN, receiving a request to predict text in application documents that differ from the training documents, the application documents including second text; determining, by applying the trained ANN to the application documents, a prediction of the second text; and after determining the prediction of the second text, providing information related to the second text as output.

In a third aspect, an article of manufacture is provided. The article of manufacture includes non-transitory data storage storing at least computer-readable instructions that, when executed by one or more processors of a computing device, cause the computing device to perform tasks. The tasks include: receiving training documents including text; parsing the training documents to determine a plurality of training data items, each training data item of the plurality of training data items including a training label related to text within the training documents and location information indicating a location of text within the training documents that is related to the training label; training an ANN to recognize text in documents using the plurality of training data items and training input, the training input including the training documents; after training the ANN, receiving a request to predict text in application documents that differ from the training documents, the application documents including second text; determining, by applying the trained ANN to the application documents, a prediction of the second text; and after determining the prediction of the second text, providing information related to the second text as output.

Other aspects, embodiments, and implementations will become apparent to those of ordinary skill in the art by reading the following detailed description, with reference where appropriate to the accompanying drawings.

DETAILED DESCRIPTION

Figure 1:
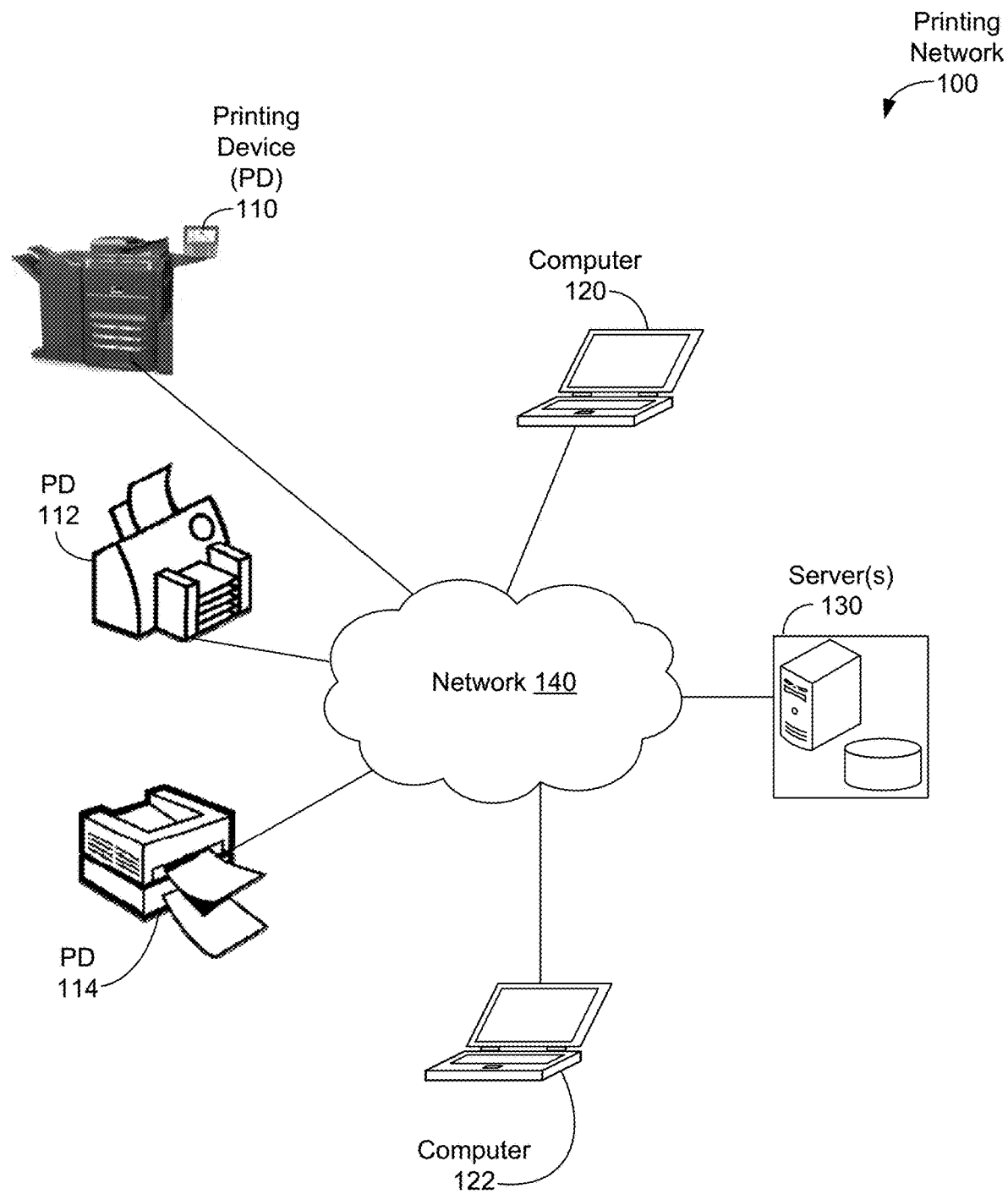
FIG. 1 is a diagram of a printing network, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Introduction

Herein described are techniques and apparatus for utilizing artificial neural networks (ANNs) and machine learning (ML) in optical character recognition (OCR). An ANN can be trained with a large number of text images (e.g., hundreds, thousands, or even more images) to predict text in the text images with competitive accuracy compared to current OCR techniques. A text image is an image that depicts one or more textual items; e.g., letters, numbers, words, sentences, paragraphs, characters, logograms, etc. These text images can be obtained from various sources and/or applications. Then, the text images can be provided to train the ANN on how to perform optical character recognition.

An artificial neural network can include a collection of "nodes" or connected units of computation that can loosely model computation. Connected nodes of an ANN can transmit signals between each other; such as numerical values. Each node can receive one or more input signals, weight the input signals, and combine the weighted input signals to generate one or more output signals. A weight of an input signal can be a numerical value that increases or decreases an effect of its input signal on the output signal.

The ANN can have one or more "layers" or groups of nodes including, but not limited to, one or more layers of input nodes, nodes arranged in one or more hidden layers, and one or more layers of output nodes. Layers that are between an input layer and an output layer can be termed "hidden layers" as these in-between layers are not visible/hidden from entities outside of the ANN. Other example ANN layers include but are limited to, input layers and output layers that respectively receive inputs from and provide outputs to entities outside of the ANN convolutional layers which convolve (e.g., downsample) their inputs, activation (e.g., RELU) layers which apply an activation function to their inputs, pooling layers which combine their inputs, and fully-connected layers where each node in the fully-connected layer receives all outputs from a previous layer as its inputs.

An ANN can be trained to learn one or more tasks. During training, the ANN can adjust weights within nodes based on a loss function that provides feedback on task performance by the ANN. Once the ANN is deemed to be trained, the trained ANN can be termed a "model". An ANN, before and during training, can generate predictions of text depicted in corresponding input text images. For example, if an input image includes a depiction of the word "flamethrower", then the ANN can generate an output that predicts the text depicted in the input image is "flamethrower".

Training an ANN can involve supervised learning. Supervised learning involves having the ANN infer a function to perform one or more tasks from labeled training data consisting of a one or more training data items. In some examples, a training data item includes at least an input object and a desired output value that can act to "label" or identify a result of the ANN's execution of the function operating on the input object. The desired output value of training data item can be termed as a "data label".

Supervised learning for the ANN to learn OCR can involve labeling one or more text images with corresponding training data items. The ANN can receive the text images as input and predict text in the text images. The training data item for a text image can include information about the text image usable for training an ANN to perform OCR on the text image. For example, a text image "Image1" depicting "ABC1" can have a data label that indicates the text "ABC1", one or more colors of the text, one or more fonts and/or font sizes of the text, one or more locations of the text within the text image, and/or other information usable for training an ANN to perform OCR on text image Image1. During supervised learning, the predicted text can be compared to text in the data labels of training data items to determine whether or not the ANN correctly recognized text in the text images. Manually generating training data items for a large amount of text depicted in a large number of text images can be a time consuming and/or expensive process.

In some examples, many or all print jobs of a printing network utilize a page description language (PDL). Example PDLs include, but are not limited to, PostScript®, Printer Control Language (PCL®), Page Description Format (PDF), Kyocera PDF (KPDF), and Extended Markup Language (XML) Paper Specification (XPS). In a PDL, primitive objects, such as text, images, shading, and vector drawings, can be precisely defined. For example, for each text character, a PDL can include a character code, a character location, a font size, a font style (e.g., plain text/regular, bold face, italic, underlined, strikethrough), a font color, and/or other information about the character.

An input PDL file can be processed to generate one or more text images for training ANNs. The input PDL file can also be parsed by a computing device to generate corresponding one or more training data items for the corresponding generated text image(s). More particularly, an input PDL file for a training document can be parsed and/or otherwise processed to extract text information, such as text characters, location information, character codes, font sizes, font styles, font colors, and/or other information about the text. The text information can be used to generate training data item(s) for the generated text image(s). The training data items can be stored in one or more training data item files.

Training data item generation can be performed at one or more text-related levels (such as a character level, a word level, a line level, a paragraph level, and/or a page level) that depend on how an ANN is to be trained to model OCR. For example, some OCR involves recognizing characters separately, so a PDL parsing tool can extract text location information, such as bounding box information, on a per-character basis. As another example, other OCR involves recognizing characters at the word level, so the PDL parsing tool can include word detection and lexicon post-processing to extract text location information on a per-word basis. As another example, some machine learning (ML)-based OCR models incorporate preprocessing such as text location detection as a trainable function. In this example, text location information can be part of a prediction made by an ANN and extracted text location information can be included in training data items used to train the ANN to learn text location detection as part of learning OCR. Other examples are possible as well.

For example, a training data item for the training document can include a training label related to text within the training document and location information indicating a location of text within the training document. The input PDL file used to generate the training data item file can be rendered, printed out, and scanned in to generate a rendered file corresponding to the training data item file.

The rendered file and content of the corresponding training data item file can be used to train one or more ANNs to learn OCR. During training, rectangular boxes containing text images can be cropped out from the rendered file using the location information from the corresponding training data item file. The cropped text image boxes can be paired with corresponding text labels from the corresponding training data item file. The cropped text image boxes can also be provided to the ANN(s) as training data for learning OCR. The ANN(s) can then predict text in the cropped text image boxes and provide corresponding prediction output. During supervised learning, the predicted text can be compared to the corresponding text labels and the ANN(s) can be adjusted based on this comparison; e.g., provided with a reward input if the predicted text matches a corresponding text label, provided with a penalty input predicted text does not match the corresponding text label.

Input PDL and rendered pages can be created and/or modified to enrich an OCR training dataset for training the ANN(s) to learn OCR. For example, data augmentation techniques, such as applying skew, rotation, noise, and/or filtering, can be applied to a rendered file to generate a new rendered file that has been partially or completely augmented; e.g., skewed, rotated, etc. Further, since PDL is a programming language, we can create and/or modify input PDL with pages of fonts of different location, size, style, color, and background, to improve the robustness of the OCR model.

For example, processing and parsing PDL files to automatically generate text images and corresponding training data items can run as batch jobs to generate hundreds, thousands, or even more rendered pages and corresponding training data item files related to print jobs from one or more applications. PDL inputs and/or rendered pages of print jobs from various applications (e.g., Word, Excel, Outlook, Visio) can provide a variety of text features for training the ANN(s) to aid in effectively reducing overfit of an OCR model of the ANN(s). The text features can include, but are not limited to, features regarding: text colors, background colors, text fonts, text sizes, text styles, character-related features, text locations, font effects, font styles, text orientation, punctuation, and page sizes. By using automated and/or batch processing, large numbers of rendered pages and corresponding training data item files can be easily added to an OCR training dataset without tedious human labeling.

Also, as both text images and training data items are generated from input PDL files, the input PDL files can be specifically created and/or modified to include, change, and/or exclude text features of the text images. Then, these specifically-created and/or modified PDL files can be used to generate specific training data sets of text images and corresponding training data items for training ANNs; e.g., a training data set with a relatively-large (or relatively-small) amount of non-standard font colors and/or background colors, a training data set with a relatively-large amount (or relatively-small) of text with specific font effects and styles. Generation of these specific training data sets can be used to improve and/or increase performance of ANNs trained with these specific training data sets. In some examples, the herein-described techniques can be used to generate millions (or more) of text images and corresponding training data items.

The herein-described techniques can be used to solve the problem of generating training data items for training ANNs to learn OCR. By processing and parsing PDL files to automatically generate text images and corresponding training data items for supervised training of ANNs, the herein-described techniques can make training of ANNs for optical character recognition more feasible. Further, the use of flexible ANNs trained on a wide variety of text images generated by processing, modifying, and parsing PDL files, including PDL files sourced from multiple different applications, can increase reliability, flexibility, and accuracy of ANN-based optical character recognition techniques.

Printing System Examples

FIG. 1 is a diagram illustrating printing network 100, according to example embodiments. Printing network 100 includes printing devices (PDs) 110, 112, 114, computers 120, 122, and one or more servers 130, all interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In example embodiments, some or all printing devices 110, 112, 114 can be connected to network 140 through one or more, possibly different, network protocols. Data can be transmitted between printing devices 110, 112, 114, computers 120, 122, and server(s) 130 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 120, 122, and/or server(s) 130 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, and/or server(s) 130 to inform other devices about colorant-usage, maintenance, error, and/or other conditions of the printing devices; e.g., idle, printing, sleeping, paper jam, low or out of paper, low or out of toner/ink, etc. Other communications between computers 120, 122, and/or server(s) 130 are possible as well, such as, but not limited to, requests to render images using radial gradient coloring and related responses to the requests, are possible as well.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS), Simple Message Transfer Protocol (SMTP), SNMP, Transfer Control Protocol/Internet Protocol (TCP/IP), User Datagram Protocol (UDP), Lightweight Directory Access Protocol (LDAP), Message Queue (MQ), and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100. In particular, computers 120, 122 can provide displays related to maintaining printing devices, including displays related to colorant usage for printing devices and/or predictions related to colorant usage, where the printing devices can include but are not limited to printing devices 110, 112, 114.

One or more servers 130 can store, update, delete, retrieve, and provide functionality for learning patterns, trends, and/or features about data related to printing network 100, particularly related to printing devices, such as printing devices 110, 112, 114. Based on the learned patterns, trends, and/or features, server(s) 130 can generate outputs, such as predictions about the printing devices including but not limited to predictions of colorant usage by the printing devices. The data stored on server(s) 130 can include device information, colorant-usage information, maintenance-event information, and/or other information related to devices related to printing network 100. The stored data can be retrieved from server(s) 130 in response to a received query (or queries) requesting information about specific device(s), colorant usage, maintenance events, and/or other information.

In some embodiments, server(s) 130 can provide additional services as well (or instead), such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 100. For example, server(s) 130 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 100. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by server(s) 130 and perhaps other data.

Figure 2:
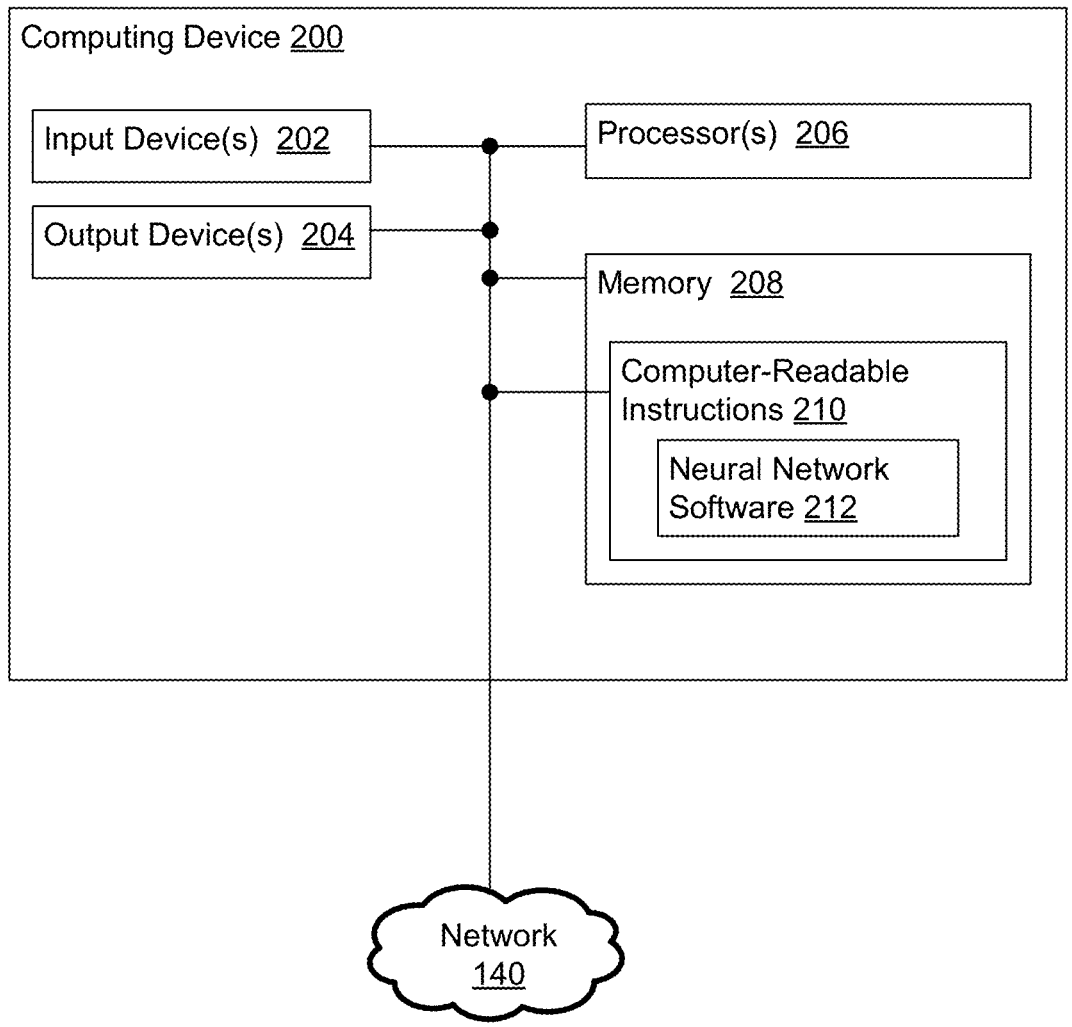
FIG. 2 is a block diagram illustrating a computing device, according to example embodiments.

FIG. 2 is a schematic block diagram illustrating computing device 200, according to example embodiments. Computing device 200 can include one or more input devices 202, one or more output devices 204, one or more processors 206, and memory 208. In some embodiments, computing device 200 can be configured to perform one or more herein-described functions of and/or functions related to: e.g., some or all of at least the functionality described in the context of an artificial neural network, a convolutional neural network, a recurrent neural network, pipelines 300, 500, methods 400, 800, and scenario 700.

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), additional graphics-related circuitry/processors, etc.). Processors 206 can be configured to execute computer-readable instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, some or all of at least the herein-described functionality of devices, networks, methods, diagrams, images, equations, and/or scenarios. In some embodiments, computer-readable instructions 210 can include at least instructions for neural network software 212. Neural network software 212 can include software and/or firmware for providing neural-network-related and/or machine-learning-algorithm-related functionality; e.g., some or all of at least the functionality described in the context of an artificial neural network, a convolutional neural network, a recurrent neural network, pipelines 300, 500 (including, but not limited to, machine learning algorithm 340 and/or predictive model 360), methods 400, 800, and scenario 700.

Techniques for Using Neural Networks in Optical Character Recognition

Figure 3:
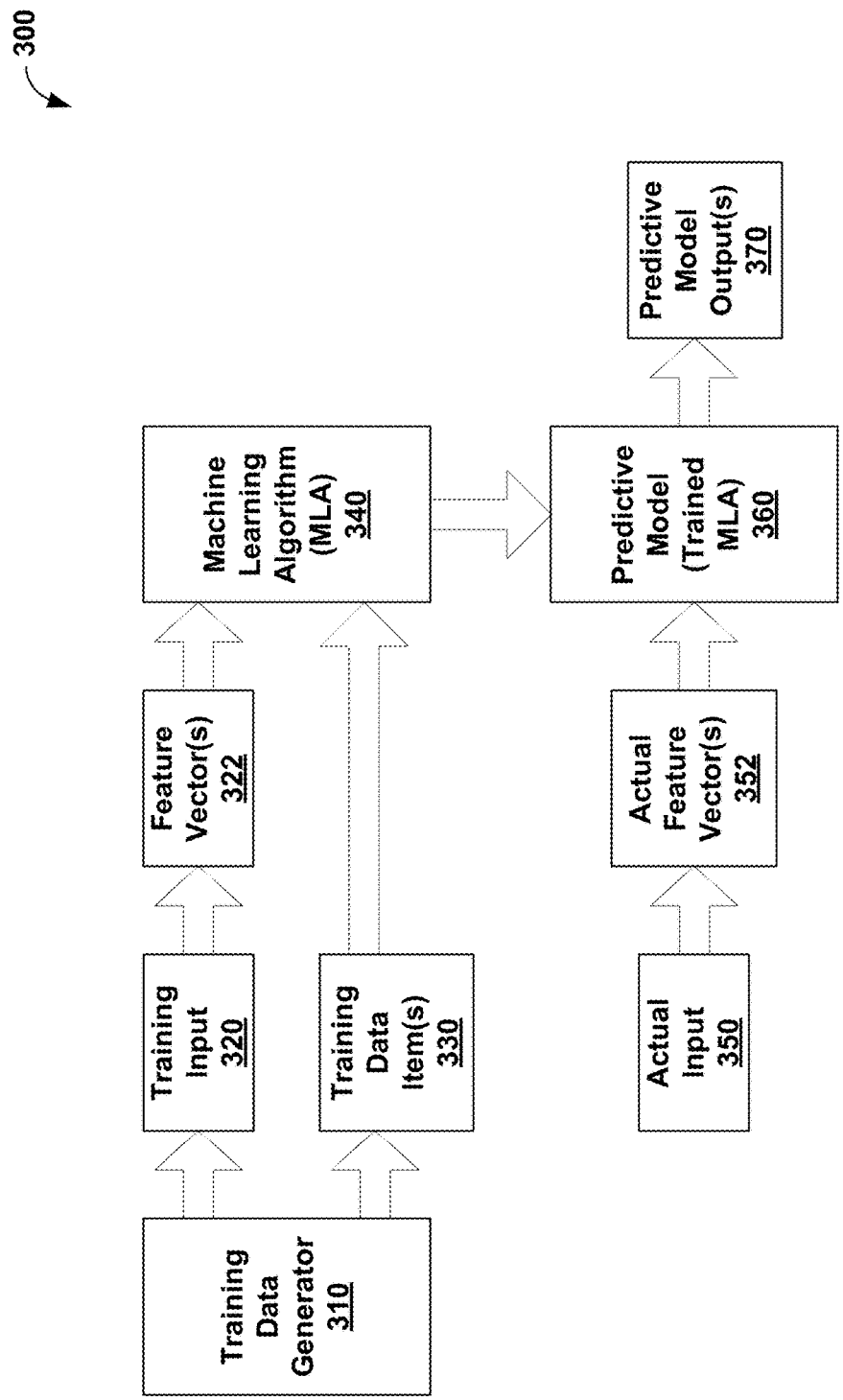
FIG. 3 is a diagram of a supervised learning pipeline, according to example embodiments.

FIG. 3 is a diagram of a supervised learning pipeline 300, according to example embodiments. Supervised learning pipeline 300 includes training data generator 310, training input 320, one or more feature vectors 322, one or more training data items 330, machine learning algorithm 340, actual input 350, one or more actual feature vectors 352, predictive model 360, and one or more predictive model outputs 370. Part or all of supervised learning pipeline 300 can be implemented by executing software for part or all of supervised learning pipeline 300 on one or more processing devices and/or by using other circuitry (e.g., specialized hardware for carrying out part or all of supervised learning pipeline 300).

In operation, supervised learning pipeline 300 can involve two phases: a training phase and a prediction phase. The training phase can involve machine learning algorithm 340 learning one or more tasks. The prediction phase can involve predictive model 360, which can be a trained version of machine learning algorithm 340, making predictions to accomplish the one or more tasks. In some examples, machine learning algorithm 340 and/or predictive model 360 can include, but are not limited, to one or more: artificial neural networks (ANNs), deep neural networks, convolutional neural networks (CNNs), recurrent neural networks, support vector machines (SVMs), Bayesian networks, genetic algorithms, linear classifiers, non-linear classifiers, algorithms based on kernel methods, logistic regression algorithms, linear discriminant analysis algorithms, and/or principal components analysis algorithms.

During the training phase of supervised learning pipeline 300, training data generator 310 can generate training input 320 and training data item(s) 330. Training input 320 can be processed to determine one or more feature vectors 322. In some examples, training input 320 can be preprocessed; e.g., for optical character recognition tasks, training input 320 can be preprocessed to calculate bounding boxes and/or other location information of text and/or other objects in input images (including text images) provided as part of training input 320. In some examples, training data generator 310 is not used to generate training input 320 and/or training data item(s).

In some examples, some or all of training input 320 includes one or more electronic training documents and/or one or more paper training documents. The electronic training documents can include, but are not limited to, one or more text images, images that do not include text, and documents encoded using a page definition language. In some examples, some or all of training input 320 is generated by scanning the paper training documents into corresponding electronic documents. In some examples, some or all of training input 320 is generated by printing at least one of the one or more electronic training documents to paper (e.g., documents expressed using a page description language) and perhaps generating an electronic copy of the at least one electronic training documents by scanning the printed versions of the at least one electronic training documents into corresponding electronic documents.

Feature vector(s) 322 can be provided to machine learning algorithm 340 to learn one or more tasks. After performing the one or more tasks, machine learning algorithm 340 can generate one or more outputs based on feature vector(s) 322 and perhaps training input 320. During training, training data item(s) 330 can be used to make an assessment of the output(s) of machine learning algorithm 340 for accuracy and machine learning algorithm 340 can be updated based on this assessment. Training of machine learning algorithm 340 can continue until machine learning algorithm 340 is considered to be trained to perform the one or more tasks. Once trained, machine learning algorithm 340 can be considered to be a predictive model, such as predictive model 360.

During the prediction phase of supervised learning pipeline 300, actual input 350 can be proceed to generate one or more actual feature vectors 352. In some examples, some or all of actual input 350 includes one or more actual electronic documents and/or one or more actual paper documents. The actual electronic documents can include, but are not limited to, one or more text images, images that do not include text, and documents encoded using a page definition language. In some examples, some or all of actual input 350 is generated by scanning the actual paper documents into corresponding electronic documents. In some examples, some or all of actual input 350 is generated by printing at least one of the one or more actual electronic documents to paper (e.g., documents expressed using a page description language) and perhaps generating an electronic copy of the at least one actual electronic documents by scanning (or otherwise converting) the printed versions of the at least one actual electronic documents into corresponding electronic documents.

Then, actual input 350 can be provided to predictive model 360 via actual feature vector(s) 352. Predictive model 360 can generate one or more outputs, such as predictions, based on actual input 350. The output(s) of predictive model 360 can then be provided as predictive model output(s) 370. In some examples, predictive model 360 can receive a request to make one or more predictions, and reception of the request can trigger predictive model 360 to generate predictive model output(s) 370 based on actual input 350 and/or actual feature vector(s) 352. In some of these examples, the request can include and/or refer to actual input 350.

In some examples, machine learning algorithm 340 can be trained on one or more training computing devices and predictive model 360 can be executed on the same training computing device(s). In some examples, machine learning algorithm 340 can be trained on the training computing device(s). Then, after training, now-trained machine learning algorithm 340 can be communicated as predictive model 360 from the training computing device(s) to one or more other computing devices that can execute predictive model 360 to operate on actual input 350 to generate predictive model output(s) 370.

As an example use of supervised learning pipeline 300, the one or more tasks can be one or more tasks related to optical character recognition; e.g., recognizing text in one or more input images. Then, training input 320 can include training documents. The training documents can be, represent, and/or include one or more images that can include text images. That is, the training documents can include text and/or depictions of text. In some examples, the training documents include documents in PDL format that can be processed to generate text and perhaps other images for training input 320. In some examples, the documents in PDL format that can be parsed to generate some or all of training data item(s) 330.

More particularly, a training document of training input 320 can be a document D_PDL in PDL format. Training data generator 310 can process PDL in D_PDL to generate one or more images that represent/depict D_PDL, and those image(s) can be provided as part of training input 320. Training data generator 310 can also parse the PDL of D_PDL to generate one or more training data items of training data item(s) 330. Training data item(s) 330, including training data item(s) generated by training data generator 310 by parsing D_PDL, can include, but are not limited to, one or more training labels and location information. The training label(s) relate to text within a corresponding document, image or other portion of training input 320. The location information can indicate one or more locations of text within the corresponding document, image or other portion of training input 320. In some examples, training data generator 310 can also generate one or more feature vectors of feature vector(s) 322 by parsing and/or otherwise processing D_PDL.

Feature vector(s) 322 can be one or more vectors that represent aspects of training input 320. Example features that can be represented in feature vector(s) 322 can include one or more text features of text images. The text feature(s) can include, but are not limited to, features related to: text colors, background colors, text fonts, text sizes, text styles, character-related features, text locations, font effects, font styles, text orientation, punctuation, and page sizes.

Feature vector(s) 322 can then be provided as an input to machine learning algorithm 340. In some embodiments, both training input 320 and feature vector(s) 322 are provided as inputs to machine learning algorithm 340. In some embodiments, training input 320 is provided directly to machine learning algorithm 340 without use of feature vector(s) 322. Then, during training, machine learning algorithm 340 operates on training input 320 and/or feature vector(s) 322 to generate one or more predictions related to optical character recognition of training input 320 and/or feature vector(s) 322; i.e., generate prediction(s) of text in input documents.

Predictions of text can include, but are not limited to, predictions of one or more characters, words, and/or other textual units. A prediction of text can include an electronic representation of text depicted in a corresponding input image; e.g., a text image in training input 320 or a text image in actual input 350. The electronic representation of the text can be formatted using one or more text formats; e.g., a plain text format (e.g., Unicode format, American Standard Code for Information Interchange (ASCII) format), a document format (e.g., Microsoft® Word format), a format based on hOCR. hOCR is based on the Extended Markup Language (XML) and is an open standard of data representation for formatted text obtained from OCR that enables encoding text, style, layout information, recognition confidence metrics and other information.

In some examples, a prediction of text can include a confidence value and/or other data related to accuracy of the predicted text. The confidence value can be determined by machine learning algorithm 340 as part of determining the output prediction of text. For example, a confidence value in the range of 0 to 100 can be determined for (and perhaps output with) an output prediction of text, where a confidence value of 0 would indicate that machine learning algorithm 340 had no (0%) confidence in the output prediction of text, where a confidence value of 100 would indicate that machine learning algorithm 340 have certain (100%) confidence in the output prediction of text, and where a value between 0 and 100 would indicate a percentage confidence in the output prediction of text. Other techniques for representing and/or providing predictions of text, electronic representations of text, and confidence values are possible as well.

The predictions of text can be assessed by comparing the predictions of text with data of training data item(s) 330;

e.g., data labels representing text in training input 320 and/or represented by feature vector(s) 322. For example, if a prediction of a text indicates text of "ABC" is in input image TRAIN_IMG1 of training input 320 and a data label of training data item(s) 330 for TRAIN_IMG1 indicates that text in TRAIN_IMG1 is "ABO", then this prediction of text would have correctly recognized two out of three characters of text in TRAIN_IMG1, and so an accuracy of this prediction of text for TRAIN_IMG1 could be determined to be: 2 correct characters/3 total characters=66.67% accuracy. In some examples, confidence values determined by the ANN can be compared to accuracy values for predictions of text to help assess correctness of the confidence values and/or to update the ANN during training. In some examples, a prediction of text can be compared with data labels in training data item(s) 330 that represent corresponding text in training input 320. If the prediction of text matches the corresponding text from the data labels in training data item(s) 330, then the accuracy of the prediction of text can be increased; otherwise, the accuracy of the prediction of text can be decreased.

Training of machine learning algorithm 340 can continue until: the occurrence of one or more training termination criteria. The training termination criteria can include, but are not limited to, criteria where machine learning algorithm 340: has predicted textual units for a number IN of input images (e.g., IN=1, 10, 100, 1000, 5000, 50000, 10000000, etc.); has predicted textual units for each item of training input 320 a number IT times (e.g., IT=1, 2, 3, . . . ), has predicted textual units for a last number N of items of training input with an accuracy that exceeds a threshold accuracy value (e.g., N=1, 10, 25, 50, 100, 1000, etc., a threshold accuracy of 50%, 90%, 95%, 99%, 99.9%, etc.).

Once trained, machine learning algorithm 340 can act as predictive model 360. Predictive model 360 can perform optical character recognition tasks taking actual input 350 and/or feature vector(s) 352 as inputs; e.g., input text images. Then, predictive model 360 can generate one or more predictions of text that is present in actual input 350 as part or all of predictive model output(s) 370; i.e., predictive model 360 can recognize text in actual input 350 and indicate the recognized text as predictions of text provided as predictive model output(s) 370. In some examples, predictive model 360 can receive a request to recognize text in actual input 350, responsively generate one or more predictions of text in actual input 350, and provide the prediction(s) of text as predictive model output(s) 370. The prediction phase/use of predictive model 360 to in performing OCR is discussed in more detail at least in the context of OCR pipeline 500 and at least FIG. 5.

Figure 4:
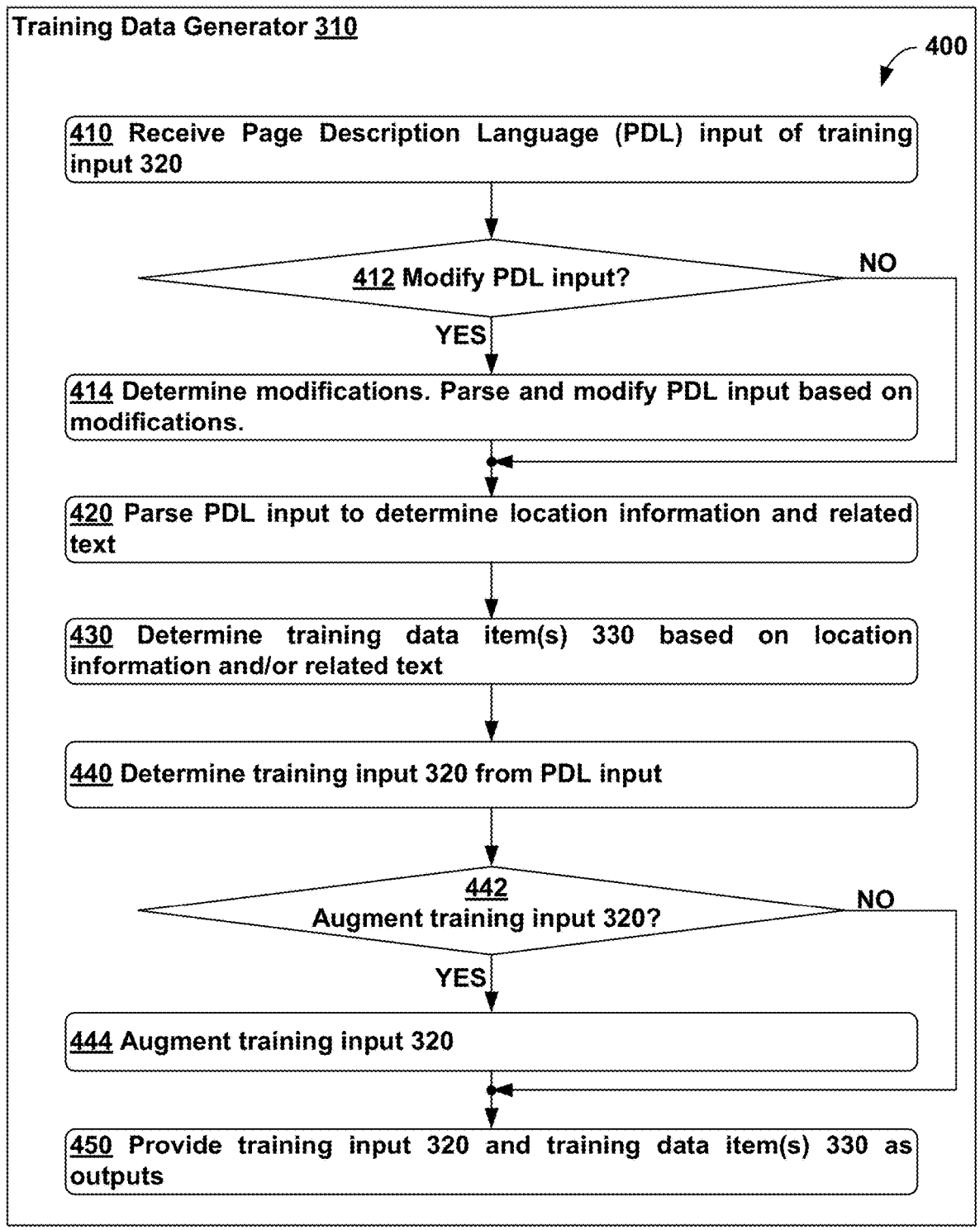
FIG. 4 depicts a training data generator of the supervised learning pipeline of FIG. 3, according to example embodiments.

FIG. 4 depicts training data generator 310 of supervised learning pipeline 300, according to example embodiments. Training data generator 310 can execute method 400 to generate some or all of training input 320 and/or training data item(s) 330.

Method 400 can begin at block 410, where training data generator 310 can receive PDL input. For example, training input 320 can include one or more training documents that include PDL—these training document(s) in training input 320 that include PDL can be termed as PDL input.

At block 412, training data generator 310 can determine whether to modify the PDL input. Training data generator 310 can determine whether to modify part or all of the PDL input based on user input related to modifying PDL input, based on one or more features of the PDL input, based on a random selection of the PDL input (e.g., randomly select a predetermined number N or predetermined percentage M % of files, documents, or other portions of training input 320, where N and M are both greater than 0, and where M is less than or equal to 100), based on a deterministic selection of the PDL input ((e.g., select the first (or last) N and/or M % of files, documents, or other portions of the PDL input; select N and/or M % files, documents, or other portions from the middle of the PDL input; select every $P^{th}$ file, document, or other portion of the PDL input, where P is greater than 0), based on data within the PDL input (e.g., based on a tag or other indicator indicating that the PDL input is to be modified, based on one or more particular features of the PDL input, such as all PDL input with green text and/or at least having a predetermined size is to be modified). In some cases, training data generator 310 can determine to modify all PDL input. For example, the PDL input can be modified to include, exclude, and/or change one or more text features, such as the text features mentioned above in the context of FIG. 3.

For example, a training data engineer and/or training data generator 310 can determine that training data for machine learning algorithm 340 does not have enough font variation. Then, training data generator 310 can modify the font types in the PDL input based on user input (e.g., from the training data engineer) and/or other information (e.g., a measure of font variation within the training data for machine learning algorithm 340). More specifically, suppose the PDL input had only one page of a particular font (e.g., "Times New Roman"), which is not enough font variation for training input 320. Then, training data generator 310 can generate more training data using the particular font as part of the PDL input and/or, more generally, generate more training data with content being same but using different font types. Many other examples of modifying the PDL input using training data generator 310 are possible as well.

If training data generator 310 determines to modify the PDL input, then training data generator 310 can proceed to block 414. Otherwise, training data generator 310 determines not to modify the PDL input and proceeds to block 420.

At block 414, training data generator 310 can determine one or more modifications of the PDL input and correspondingly modify the PDL input to make the one or more modifications. In some examples, the modifications can involve modifying one or more text features of the PDL input. In some examples, modifying the PDL input can include modifying the PDL input to include one or more of: text utilizing a plurality of different fonts, text utilizing a plurality of different colors, text utilizing a plurality of different sizes, text utilizing a plurality of different styles, and a plurality of pages utilizing a plurality of background colors. In some examples, modifying the PDL input can include modifying the PDL input so that an electronic document generated using the PDL input is augmented such as discussed below in the context of blocks 442 and 444. In some examples, modifying the PDL input can include adding one or more PDL instructions and/or documents formatted using PDL; e.g., receiving a first PDL input document, copying the first PDL input document to a second PDL document, modifying the second PDL document, and providing both the first and second PDL documents as outputs of block 414. As another example of adding one or more PDL instructions and/or documents formatted using PDL, training data generator 310 can add one or more PDL instructions and/or documents that are unrelated to the PDL input; e.g., PDL instructions and/or documents representing specific test cases for training machine learning algorithm 340. Then, the one or more PDL instructions and/or documents that are unrelated to the PDL input can be provided as an output of block 414. Other modifications of PDL input are possible as well.

At block 420, training data generator 310 can parse the PDL input to determine location information (e.g. bounding boxes) and related text. The PDL input of block 420 can include PDL input received at block 410 that may have been modified at block 414. Location information can indicate one or more locations of text within the PDL input (or more generally, within training input 320). An example of location information is a location and/or a bounding box locating one or more characters, words, and/or other textual units of text represented by the PDL input. A bounding box can specify a rectangular region where text is located; e.g., specify an upper-left-hand corner and a lower-right-hand corner of the rectangular region where text is located. Related text can be text specified in the PDL input using PDL and/or other text in the PDL input; e.g., text in an image formatted/referred to by PDL instructions of the PDL input. Related text can be related to location information; e.g., location information can specify one or more locations in PDL input to find/locate the related text. By parsing the PDL input, which can include unmodified PDL input, to determine location information and related text, training input 320 can be based on thousands of existing application PDL documents, which can be stored in one or more datasets. Then, by parsing these (datasets of) existing application PDL files to determine location information and related text, training data generator 310 can generate training data item(s) 330 and generate training input 320 as discussed below and so can leverage the existing application PDL documents while training machine learning algorithm 340.

At block 430, training data generator 310 can determine training data item(s) 330 based on location information and/or related text. For example, the location information and/or related text that are determined by parsing the PDL input at block 420 can be stored and/or otherwise used to create and/or update training data item(s) 330. A training data item TDI1 of training data item(s) 330 can store text T1 in the PDL input (or more generally, within training input 320) and location information specifying one or more locations Loc1 of text T1. That is, training data item TDI1 can relate the location information specifying location(s) Loc1 in PDL input to find/locate text T1 in the PDL input. For example, suppose that PDL input for document TESTDOC1 indicates that the words "Printing Device" are be written 72 pixels below and 72 pixels to the right of the upper left hand corner (ULHC) of page 1 of TESTDOC; that is, to be written at a location (72, 72) with respect to the ULHC of page 1. Then, training data generator 310 can parse the PDL input for document TESTDOC1 to determine location information (72, 72) for text "Printing Device" on page 1 of document TESTDOC1. After parsing the PDL input for document TESTDOC1, training data generator 310 can create or update a training data item TDI_TESTDOC1 to store the location information (72, 72) and the related text "Printing Device" as part of TDI_TESTDOC1. In a related example, suppose that a lower right hand corner of a bounding box bounding the text "Printing Device" on page 1 of document TESTDOC1 is at location (89, 155) with respect to the ULHC of page 1. Then, training data generator 310 can parse the PDL input for document TESTDOC1 to determine a bounding box [(72, 72) (89, 155)] for text "Printing Device" as location information and can then store the bounding box [(72, 72) (89, 155)] as location information for the related text "Printing Device" as part of TDI_T-ESTDOC1 Other examples are possible as well.

By combining the procedures of block 420 and 430, training data generator 310 can be considered to parse the PDL input (at block 420) to determine training data item(s) 330 (at block 430). Other techniques for determining training data item(s) 330 based on location information and/or related text are possible as well.

At block 440, training data generator 310 can determine at least part of training input 320 from the PDL input. For example, training data generator 310 can process the PDL input to generate one or more electronic and/or paper documents; e.g., print the PDL input to one or more files and/or to paper. Then, the generated one or more electronic and/or paper documents can be used as part or all of training input 320. Other techniques for determining determine at least part of training input 320 from the PDL input are possible as well.

At block 442, training data generator 310 can determine whether to augment training input 320. Training data generator 310 can determine whether to augment part or all of training input 320 based on user input related to augmenting training input 320, based on one or more features of training input 320, based on a random selection of training input 320 (e.g., randomly select a predetermined number N or predetermined percentage M % of files, documents, or other portions of training input 320, where N and M are both greater than 0, and where M is less than or equal to 100), based on a deterministic selection of training input 320 (e.g., select the first (or last) N and/or M % of files, documents, or other portions of training input 320; select N and/or M % files, documents, or other portions of PDL input of documents, or other portions from the middle of the training input 320, select every $P^{th}$ file, document, or other portion of training input 320, where P is greater than 0), based on data within training input 320 (e.g., based on a tag or other indicator indicating that training input 320 is to be modified, based on one or more particular features of training input 320, such as all training input 320 with green text and/or at least having a predetermined size is to be augmented). In some cases, training data generator 310 can determine to augment all of training input 320. Example data augmentation techniques for augmenting of training input are described below in the context of block 444. If training data generator 310 determines to augment training input 320, then training data generator 310 can proceed to block 444.

For example, suppose a training data engineer and/or training data generator 310 determine that training input 320 does not have enough tilted pages; that is. pages whose axes are at various angles Then, training data generator 310 can augment training input 320 based on user input (e.g., from the training data engineer) and/or other information (e.g., a measure of titled pages within training input 320). In this example, training data generator 310 can apply one or more affine transformations on original pages of training input 320 to generate more tilted pages. Many other examples of augmenting training input 320 using training data generator 310 are possible as well.

At block 444, training data generator 310 can augment training input 320 by performing one or more data augmentation techniques on part or all of training input 320. The data augmentation techniques can include modifying part or all of one or more particular electronic documents in training input 320. The one or more data augmentation techniques can include, but are not limited to. a technique to skew at least part of the particular electronic document(s) in training input 320, a technique to rotate at least part of the particular electronic document(s) in training input 320, a technique to introduce noise into at least part of the particular electronic document(s) in training input 320, and a technique to filter at least part of the particular electronic document(s) in training input 320. The one or more particular electronic documents in training input 320 can be randomly or otherwise selected from training input 320; e.g., select one or more documents randomly from training input 320, select every Nth document (N>1) from training input 320, select all documents from training input 320, select the first N documents (N>0) from training input 320, select the last N documents (N>0) from training input 320, etc.

In some examples, training data generator 310 can augment training input 320 by adding one or more augmented documents to training input 320; e.g., receiving a first input document as part of training input 320, copying the first input document to a second input document, augmenting the second input document by performing one or more of the data augmentation techniques mentioned above on the second input document, and providing both the first input document and the augmented second input documents as outputs of block 414. As another example of adding one or more augmented documents to training input 320, training data generator 310 can add one or more augmented documents that are unrelated to training input 320; e.g., augmented documents representing specific test cases for training machine learning algorithm 340. Then, the one or more augmented documents that are unrelated to training input 32 as an output of block 444. Other augmentations of training input 320 are possible as well.

At block 450, training data generator 310 can provide training input 320 and training data item(s) 330 as outputs. Upon completion of block 450, method 400 can be completed.

In some examples, method 400 can further include generating at least part of feature vector(s) 322. For example, at block 420, training data generator 310 parses PDL input to determine location information and/or related text. Then, training data generator 310 can also parse PDL input to determine one or more text features and/or other features of the PDL input that can be used in feature vector(s) 322 to represent aspects of training input 320; e.g., portions of training input 320 that are based on the PDL input. In some of these examples, at block 450, training data generator 310 can also provide the generated at least part of feature vector(s) 322 as an output as well.

Figure 5:
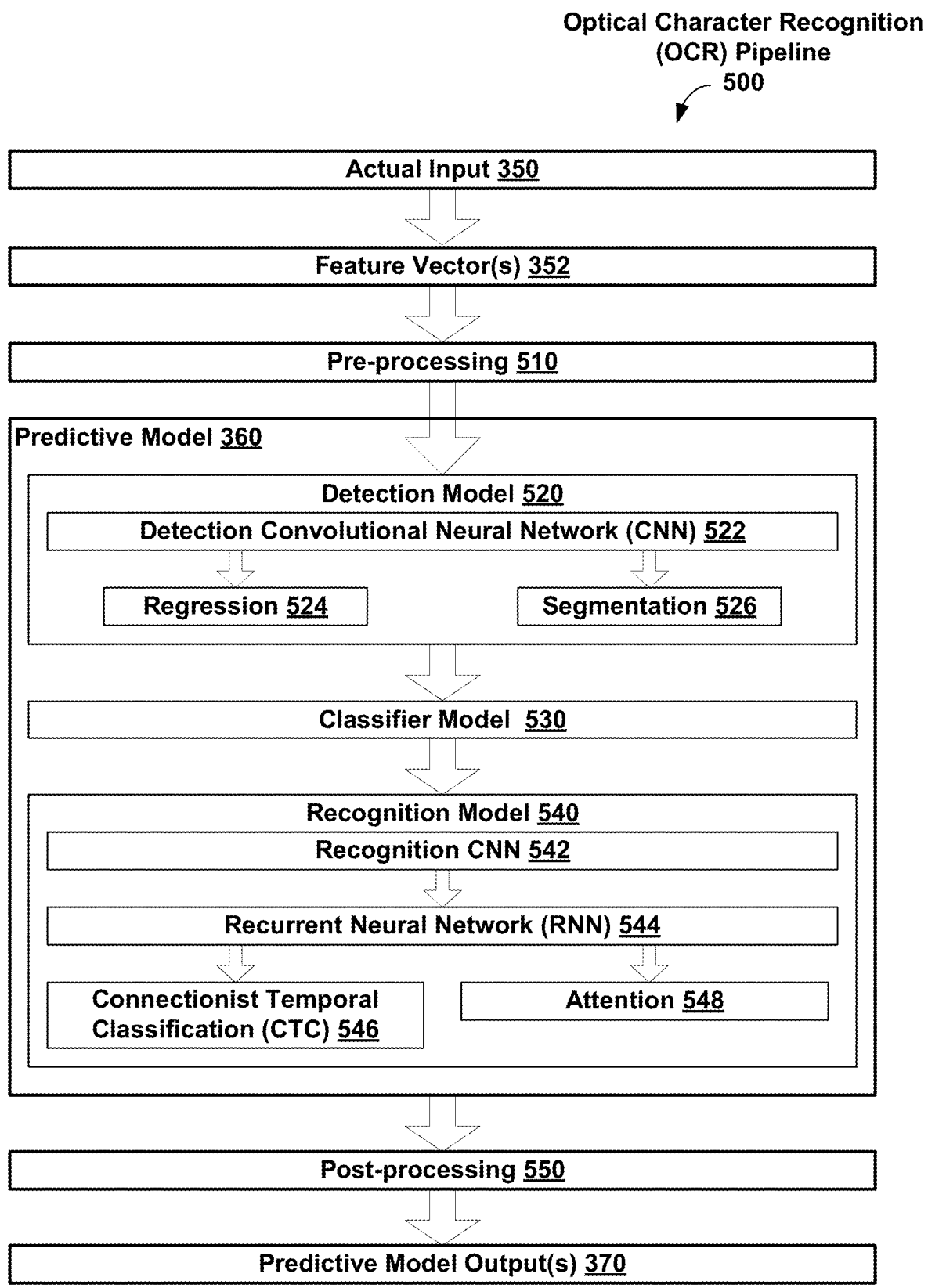
FIG. 5 is a diagram of a pipeline for optical character recognition, according to example embodiments.

FIG. 5 is a diagram of an OCR pipeline 500 for optical character recognition, according to example embodiments. In some examples, OCR pipeline 500 can be related to and/or implement the prediction phase of supervised learning pipeline 300. OCR pipeline 500 includes actual input 350, actual feature vector(s) 352, preprocessing 510, predictive model 360, post-processing 550, and predictive model output(s) 370. Part or all of OCR pipeline 500 can be implemented by executing software for part or all of OCR pipeline 500 on one or more processing devices and/or by using other circuitry (e.g., specialized hardware for carrying out part or all of OCR pipeline 500).

In operation, OCR pipeline 500 can begin by receiving actual input 350. In particular, actual input 350 to OCR pipeline 500 can include one or more actual electronic documents and/or one or more actual paper documents, where the paper documents can be scanned into corresponding electronic documents, such as discussed above at least in the context of FIG. 3. In some examples, actual input 350 can include one or more documents in PDL format—the document(s) in PDL format can be printed to electronic documents that can be subsequently used as part of the actual electronic documents of actual input 350. The actual electronic documents can be, represent, and/or include one or more images that can include text images. That is, actual electronic documents can include text and/or depictions of text.

After receiving actual input 350, OCR pipeline 500 can generate one or more actual feature vectors 352 based on actual input 350. Actual feature vector(s) 352 can represent aspects of actual input 350. Example features that can be represented in actual feature vector(s) 352 can include one or more text features of text images. The text feature(s) can include, but are not limited to, features related to: text colors, background colors, text fonts, text sizes, text styles, character-related features, text locations, font effects, font styles, text orientation, punctuation, and page sizes.

After generating actual feature vector(s) 352, OCR pipeline 500 can proceed by preprocessing 510 the received actual input 350 and/or actual feature vector(s) 352. Preprocessing 510 can involve similar preprocessing as discussed above for the training phase of supervised learning pipeline 300. That is, actual input 350 can be preprocessed to locate text and/or related objects (e.g., text images) within actual input 350. In particular, actual input 350 can be preprocessed to calculate bounding boxes and perhaps other location information of text and/or related objects within actual input 350. In some examples, data from actual feature vector(s) 352 can be used during preprocessing of actual input 350.

After preprocessing 510, OCR pipeline 500 can proceed to use predictive model 360 to recognize text in preprocessed actual input 350. FIG. 5 shows that predictive model 360 of OCR pipeline 500 can include detection model 520, classifier model 530, and recognition model 540. When predictive model 360 receives preprocessed actual input 350 from preprocessing 510, predictive model 360 first utilizes detection model 520 to detect text within preprocessed actual input 350. Predictive model 360 then utilizes classifier model 530 to classify text found by detection model 520. Predictive model 360 proceeds by utilizing recognition model 540 to recognize text classified by classifier model 530 and then outputs results of recognition model 540 of recognized text as predictions of text recognized within preprocessed actual input 350.

Detection model 520 includes trained detection convolutional neural network (CNN) 522 to perform regression 524 and segmentation 526 on actual feature vector(s) 352 to recognize text. A convolutional neural network is an ANN that assumes inputs provided on its input layer are image-related inputs, such as text images, and includes hidden layers organized for image processing and/or other image-related tasks. Regression 524 can involve determining how text is "oriented" or relatively positioned within a text image and/or other image received in actual input 350; e.g., within a bounding box where text is located (perhaps determined during preprocessing 510). For example, text can be curved, aligned with vertical and/or horizontal axes of the bounding box, tilted with respect to vertical and/or horizontal axes of bounding box, etc. Therefore, determining an orientation of text within the bounding box can be part of recognizing the text within the bounding box. As such, trained detection CNN 522 can be utilized to perform regression 524 to determine an orientation of text within the text image, document, and/or other input received in actual input 350.

Segmentation 526 can involve determining one or more regions or segments of a text image and/or other image received in actual input 350 that include text. In some examples, segmentation 526 can involve determining segments of a bounding box that include text. As such, trained detection CNN 522 can be utilized to perform segmentation 526 to determine portions of text image, document, and/or other input received in actual input 350 include text.

Figure 6A:
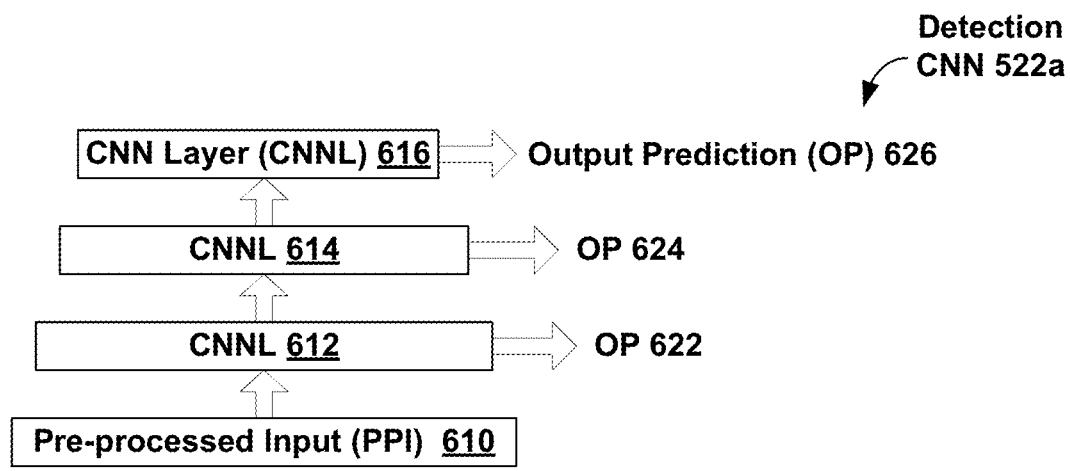
FIG. 6A is a diagram of a detection convolutional neural network (CNN) of the pipeline of FIG. 5, according to example embodiments.

FIG. 6A is a diagram of detection CNN 522a that can be trained to perform text detection as detection model 520. Detection CNN 522a receives preprocessed input (PPI) 610 at CNN layer 612. A CNN layer, such as one or more of CNN layers 612, 614, 616, 632, 634, 636, 640, 642, 644, 662, 664, 666, 670, 672, 674, can perform convolution, activation, and pooling tasks using respective one or more convolution layers of the CNN layer, one or more activation layers of the CNN layer, and one or more pooling layers of the CNN layer. The convolution layer(s) can learn one or more filters to filter their respective inputs. Each filter can work over a subset of an input to the activation layer—for example, if an input to the convolution layer represents an input of X*Y pixels having Z different color inputs (e.g., a text image of size X*Y pixels in either Z=1 for a greyscale color image, Z=3 for a red-green-blue (RGB) image, or Z=4 for a cyan-magenta-yellow-black (CMYK) image), then the input to the convolution layer can be considered to be a X*Y*Z volume of input pixels*colors. Then, a filter of the convolution layer can filter a portion of the X*Y*Z volume; e.g., filter X1*Y1*Z1 pixels/colors, where X1≤X, Y1≤Y, and Z1≤Z. For example, suppose an input to CNN layer 612 was a 100×100 pixel text image in CMYK format (Z=4) and a convolution layer of CNN layer 612 received the 100×100×4 volume of pixels/colors as an input volume and acted to convolve a 3×3×3 filter over the 100×100×4 volume. Many other examples of input volumes and filters are possible as well.

To convolve the filter over the volume, the convolution layer can slide the filter across the width and height of the input volume and compute dot products between the entries of the filter and the input at each position that the filter is on the input volume. As the convolution layer slides the filter over the width and height of the input volume, the convolution layer can be considered to generate a 2-dimensional activation map that gives the responses of that filter at every spatial position of the input volume.

The output of the convolution layer (e.g., the activation map mentioned above) can be provided as an input to an activation layer. The activation layer can determine whether the output of an input layer (e.g., the convolution layer) is to be provided to a subsequent layer. For example, suppose the activation map has values in the range [0, 1] and that only activation map values above 0.4 are to be provided to a subsequent layer. Then, the activation layer could map activation map values in the range [0, 0.4] to 0 (representing no activation), and map activation map values in the range (0.4, 1] to 1 (representing activation). More generally, a convolution layer of a CNN layer can model an activation function, such as a sigmoid/logistic activation function, a hyperbolic tangent activation function, a rectified linear unit (ReLU) activation function, or another activation function to determine whether the output of the convolution layer is to be provided to a subsequent layer. A CNN layer can include one or more pairs of convolution and activation layers to filter inputs to perform a task; e.g., detect and/or classify text.

Output of the pair(s) of convolution and activation layers can be provided to a pooling layer. The pooling layer can downsample the now-filtered input provided by convolution and activation layers. The pooling layer can slide a pooling filter over an input volume in a similar fashion as discussed above for the convolution. The pooling filter can effective carry out a function over the pixels/colors sampled; e.g., determine a maximum value of the pixels/colors sampled by the pooling filter; determine an average value of the pixels/colors sampled by the pooling filter, and provide the function output as the output of the filter. For example, if the pooling filter calculates a maximum value over a 2×2×1 input volume of pixels/colors, the pooling filter will reduce the four values in the 2×2×1 input volume to one output (maximum) value, thereby downsampling the 2×2×1 input volume to 1 value; i.e., downsampling by a factor of two in both X and Y coordinates of the input. Many other examples of pooling filters are possible as well. Thus, a CNN layer can selectively filter and downsample its input using convolution, activation, and pooling layers to extract features about the input to the CNN layer. The resulting output of a CNN layer can be represented as a feature vector.

In some examples, a pooling layer can be used to upsample its input; e.g., the pooling layer can provide multiple outputs, each of which are the same as its input. For example, an single pixel/color input I_UPSAM can be received at an upsampling pooling layer that outputs a 2×2×1 volume of pixels/colors, each of which have a value of I_UPSAM or another value based on I_UPSAM (e.g., a weighed and/or filtered value of I_UPSAM). Thus, the upsampling pooling layer upsamples the pixel/color input I_UPSAM by a factor of four to generate the 2×2×1 volume of pixels/colors.

In some examples, a pooling layer performing upsampling can receive information about related input; e.g., input received via skip connection from another layer. A skip connection is a connection between layers of an ANN that avoid or "skip" one or more layers of the ANN. The input received via skip connection can provide information about features that can be used to calculate the upsampled output of the upsampling pooling layer. For example, in the context of FIG. 6B, a skip connection from CNN layer 632 to CNN layer 644 can provide "coarse" input about pre-processed input 630 to CNN layer 644 before that input had been downsampled by CNN layer 632. The upsampling pooling layer can also receive inputs from non-skip connections— continuing the previous example, "fine" input can be received from CNN layer 642, such as the I_UPSAM value mentioned above. The upsampling pooling layer can then combine the coarse and fine inputs to generate its output; for example, a convolution transpose operation (also termed deconvolution) where a filter is used to weight the fine input over each color/pixel of the coarse inputs and the weighted fine input and coarse inputs are combined (e.g., multiplied and/or added) to generate upsampled output of the upsampling pooling layer. Other techniques for upsampling and/or other examples of pooling layers for downsampling and other examples of pooling layers for upsampling are possible as well.

For example, preprocessed input 610 can be preprocessed actual input 350 provided via preprocessing 510. CNN layer 612 can process preprocessed input 610 (e.g., filter and downsample preprocessed input 610 into a first feature vector), generate resulting output prediction (OP) 622 of text within preprocessed input 610, and provide input (e.g., the first feature vector) to CNN layer 614. CNN layer 614 can process the input provided by CNN layer 612 (e.g., filter and downsample input provided by CNN layer 612 into a second feature vector), generate resulting output prediction 624 of text within preprocessed input 610, and provide input (e.g., the second feature vector) to CNN layer 616. CNN layer 616 can process the input provided by CNN layer 612 (e.g., filter and downsample input provided by CNN layer 614) and generate resulting output prediction 626 of text within preprocessed input 610. Then, the output of detection CNN 522a can be one or more of output predictions 622, 624, 626.

In some examples, the output of detection CNN 522a and/or output predictions 622, 624, 626 can classify preprocessed input 610 as being one or more text characters; e.g., an "A", a "B", ... a "Z", an "a", a "b", ... a "z", a "0", a "1" ... a "9", a "!" .... The output of detection CNN 522a and/or output predictions 622, 624, 626 can also classify preprocessed input 610 as not being a text character; i.e., have a "no character" classification for preprocessed input 610. Then, text can be considered to be detected in preprocessed input 610 by detection CNN 522a if the output of detection CNN 522a is something other than "no character"; e.g., an input classifying the preprocessed input as a "Q". And, text can be considered not to detected in preprocessed input 610 by detection CNN 522a if the output of detection CNN 522a is the "no character" output; e.g., if preprocessed input 610 represents a block of pixels all having the same color, and therefore not representing a text character.

Figure 6B:
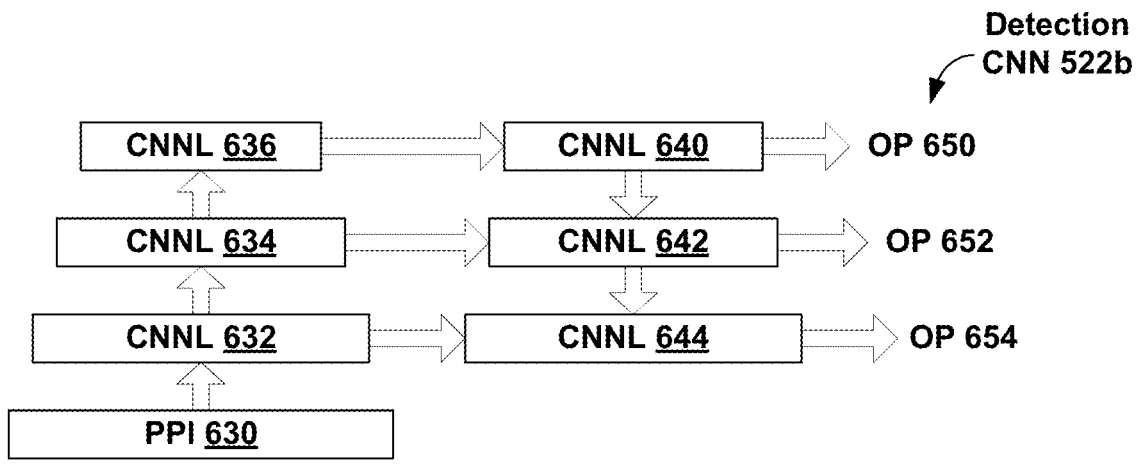
FIG. 6B is another diagram of a detection CNN of the pipeline of FIG. 5, according to example embodiments.

FIG. 6B is a diagram of detection CNN 522b that can be trained to perform text detection as detection model 520. Detection CNN 522b receives preprocessed input 630 at CNN layer 632. For example, preprocessed input 630 can be the preprocessed actual input 350 provided via preprocessing 510. CNN layer 632 can process preprocessed input e.g., filter and downsample preprocessed input 610 into a fourth feature vector) and provide input (e.g., the fourth feature vector) to CNN layers 634 and 644. CNN layer 634 can process the input provided by CNN layer 632 (e.g., filter and downsample input provided by CNN layer 632 into a fifth feature vector) and provide input (e.g., the fifth feature vector) to CNN layers 636 and 642. CNN layer 636 can process the input provided by CNN layer 634 (e.g., filter and downsample input provided by CNN layer 634 into a sixth feature vector) and provide input (e.g., the sixth feature vector) to CNN layer 640. In some examples, the input provided by CNN layer 632 to CNN layer 644, the input provided by CNN layer 634 to CNN layer 642, and/or the input provided by CNN layer 634 to CNN layer 640 can act as a skip connection between a pair of CNN layers.

CNN layer 640 of detection CNN 522b can process input provided by CNN layer 634 (e.g., upsample the sixth feature vector and pool resulting features into a seventh feature vector), generate resulting output prediction 650 of text within preprocessed input 630, and provide input (e.g., the seventh feature vector) to CNN layer 614. CNN layer 642 can process input provided by CNN layers 640 and 634 (e.g., filter and upsample the seventh feature vector using data provided by CNN layer 634 to generate a eighth feature vector), generate resulting output prediction 652 of text within preprocessed input 630, and provide input (e.g., the eighth feature vector) to CNN layer 644. CNN layer 644 can process input provided by CNN layers 642 and 632 (e.g., filter and upsample the eighth feature vector using data provided by CNN layer 632) and, generate resulting output prediction 654 of text within preprocessed input 630. Then, the output of detection CNN 522b can be one or more of output predictions 650, 652, 654.

Figure 6C:
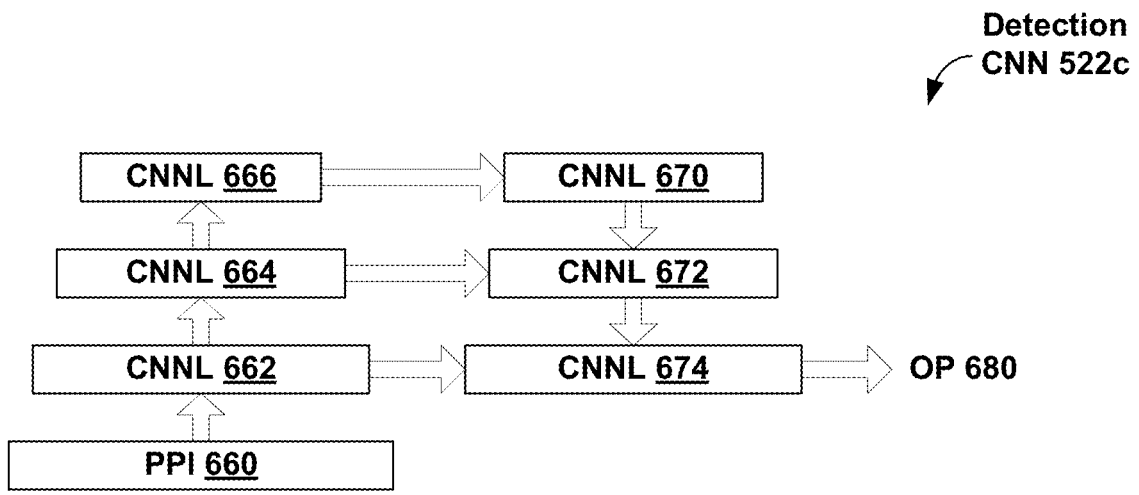
FIG. 6C is another diagram of a detection CNN of the pipeline of FIG. 5, according to example embodiments.

FIG. 6C is a diagram of detection CNN 522c that can be trained to perform text detection as detection model 520. FIG. 6C operates in a similar fashion to detection CNN 522c, where preprocessed input 660 of detection CNN 522c plays the role of preprocessed input 630 of detection CNN 522b, and where respective CNN layers 662, 664, 666, 670, 672, 674 play the respective roles of CNN layers 632, 634, 636, 640, 642, 644, except that CNN layers 670 and 672 do not provide output predictions. Rather, in detection CNN 522c, only CNN layer 674 provides output prediction 680 and the output of detection CNN 522c is output prediction 680.

Returning to FIG. 5, classifier model 530 of prediction model 360 can be trained to classify text. Classifier model 530 can determine a probability that a portion of the text being classified represents a particular textual character; e.g., the textual character has a particular ASCII or Unicode value. More particularly, ASCII encodes 128 characters (or 256 characters for Extended ASCII), and classifier model 530 can have at least 128 (or 256) outputs $O_0 \ldots O_{127}$ (or $O_0 \ldots O_{255}$ for extended ASCII), where an output $O_x$ is a probability that a current portion of an input to classifier model 530 depicts an input character whose ASCII value is x. That is, if the current portion depicts a 'Q' character, the network outputs $O_{65} \ldots O_{90}$ representing the upper case characters can provide outputs such as 0.1% for $O_{65}$ (representing "A"), 2% for $O_{66}$ (representing "B"), 0.01% for $O_{67}$ (representing "C") ... 89% for $O_{81}$ (representing "Q") ... and 1.1% for $O_{90}$ (representing "Z"}. In some examples, classifier model 530 can have another output; e.g., $O_{128}$ for ASCII (or $O_{256}$ for extended ASCII) is a "no character" output with a probability that the portion of the text being classified does not represent any ASCII (or extended ASCII) character. Other outputs of classifier model 530 are possible as well.

A loss function that measures inconsistencies between predicted values and ground truth values (e.g., data labels from a training data item) can be used during supervised learning to train classifier model 530. More particularly, a loss function LF1 for training classifier model 530 can be based on a mean-square-error (MSE) value representing a "Euclid distance" between the predicted value and a data label of a training data item; that is, for the upper case characters in this "Q" example, the loss function LF1 can determine a value of 0% for $O_{65}$ (representing "A"), 0% for $O_{66}$ (representing "A"), 0% for $O_{67}$ (representing "C"), ... 100% for $O_{81}$ (representing "Q"), ... and 0% for $O_{90}$ (representing "Z"}. The output of the loss function can be back-propagated by a gradient of each layer of classifier model 530 to decide how much to adjust the parameters of each layer to reduce an error value; e.g., an error value calculated based on a difference between $O_x$ and $LF1(O_x)$, such as $|O_x - LF1(O_x)|$ (an L1 norm) or $\{O_x - LF1(O_x)\}^2|^{1/2}$ (an L2 norm). Other loss functions are possible as well; e.g., the loss function can be based on cross-entropy loss and/or other values.

That is, classifier model 530 can learn how to classify depicted characters (and thereby perform optical character recognition) by adjusting weights of its nodes trying to reduce the error value iteratively over each portion of each input image. Training of classifier model 530 can be completed when error values are below a threshold; e.g., a sum of error values SEV that is summed over $O_0 \ldots O_{127}$ (or $O_0 \ldots O_{255}$ for extended ASCII) and summed over a pre-determined number NEV (e.g., 1, 10, 1000, 5000) input images is less than a threshold error value TEV (i.e., training is complete when SEV<TEV when SEV is summed over the last NEV input images). Other techniques are possible to determine when training of classifier model 530 is completed.

Recognition model 540 can include trained recognition CNN 542 and trained recurrent neural network 544. Recognition CNN 542 can determine which character has recognized by classifier model based on the outputs $O_x$ of classifier model 530. Continuing the classification example above regarding the letter "Q", suppose that classifier model 530 receives a "Q" as an input and then outputs the outputs mentioned above; e.g., 0.1% for $O_{65}$ (representing "A"), 2% for $O_{66}$ (representing "B"), 0.01% for $O_{67}$ (representing "C"), . . . 89% for $O_{81}$ (representing "Q") . . . and 1.1% for $O_{90}$ (representing "Z"}. Recognition CNN 542 can receive the outputs $O_x$ of classifier model 530 and determine that $O_{81}$ (representing "Q") has the highest probability, and so determine that classifier model 530 has recognized the character "Q".

Recurrent neural network 544 can include a recurrent neural network, which is an ANN that has connections between nodes of the ANN that form a directed graph along a temporal sequence. Recurrent neural network 544 can using one or more memory layers to store past inputs/events; e.g., store information about previously received characters/textual items. These connections between nodes and/or memory layer(s) enable recurrent neural network 544 to exhibit temporal dynamic behavior; i.e., changing behaviors over time.

Trained recurrent neural network 544 can utilize functionality including connectionist temporal classification 546 and attention 548 to recognize text based on its input; e.g., the output of recognition CNN 542. From a point of view of recurrent neural network 544, its inputs from recognition CNN 542 can be considered to be a temporal sequence of recognized characters, or more generally, textual items. Then, trained recurrent neural network 544 can predict text from the temporal sequence of recognized textual items; e.g., predict words of text from the temporal sequence of recognized textual items.

Connectionist temporal classification 546 can be part of and/or used by trained recurrent neural network 544 to provide inputs to segment the input received by recurrent neural network 544; e.g., to segment the temporal sequence of recognized textual items into words, phrases, sentences, etc. Attention 548 can allocate "attention" or weights to be placed on past inputs recalled from the memory layer(s) of recurrent neural network 544 and the inputs to segment the input from connectionist temporal classification 546 to determine how to weight these inputs to better predict text from the temporal sequence of recognized textual items.

After predictive model 360 has recognized text in preprocessed actual input 350, OCR pipeline 500 can proceed to perform post-processing 550 of the output(s) of predictive model 360. For example, if recognition model 540 provides outputs at a character (or word) level, post-processing 550 can involve reformatting the outputs to be words (or phrases/sentences) of text. As another example, if recognition model 540 provides outputs about recognized text and probabilities of recognized text, then post-processing 550 can involve combining the outputs about recognized text and the outputs about probabilities of recognized text into one common output including both text and probabilities to be provided as predictive model output(s) 370. In a related example, if recognition model 540 provides outputs about recognized text and probabilities of recognized text, then post-processing 550 can involve selecting from these outputs; e.g., if outputs about probabilities of recognized text are not necessary, then post-processing 550 can select only the outputs about recognized text to be output as predictive model output(s) 370.

After post-processing 550 of the output(s) of predictive model 360 is complete, OCR pipeline 500 can proceed to provide predictive model output(s) 370. OCR pipeline 500 can provide predictive model output(s) 370 by storing some or all of predictive model output(s) 370, communicating some or all of predictive model output(s) 370 to one or more other computing devices, displaying some or all of predictive model output(s) 370, and/or otherwise furnish some or all of predictive model output(s) 370 as outputs.

In some examples, specific hardware can be built to embody part or all of predictive model 360 and/or OCR pipeline 500 (e.g., an application specific integrated circuit (ASIC), a graphics processor unit (GPU), a tensor processing unit (TPU), and/or other circuitry). For example, the specific hardware representing predictive model 360 and/or OCR pipeline 500 can be embodied as one or more "OCR chips" used to perform optical character recognition on devices that commonly perform optical character recognition; e.g., scanning/printing devices.

Figure 7:
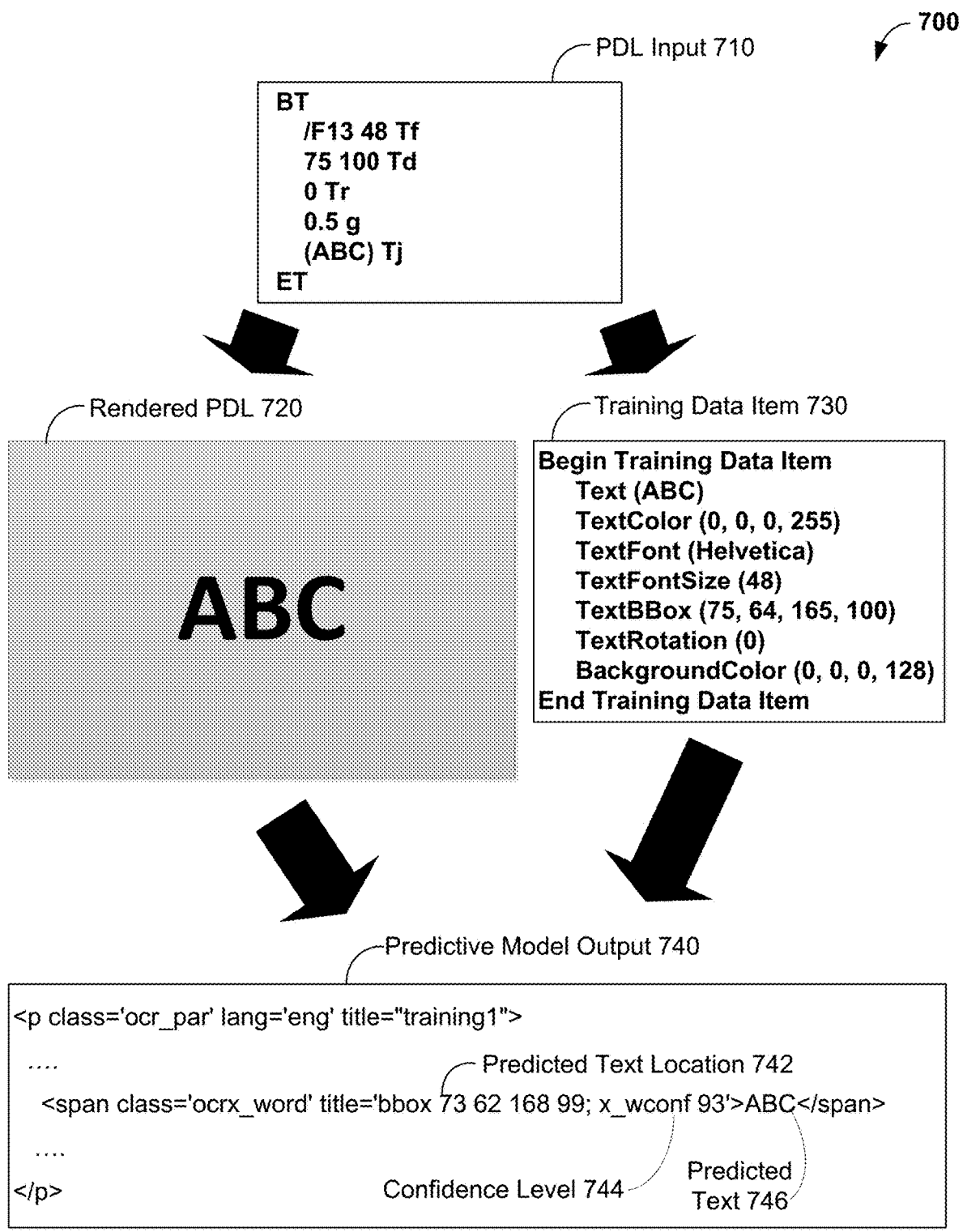
FIG. 7 illustrates a scenario where the pipeline of FIG. 3 generates predictive model output for example PDL input, according to example embodiments.

FIG. 7 illustrates scenario 700 where supervised learning pipeline 300 is trained and related OCR pipeline 500 generates predictive model output 740 based on PDL input, according to example embodiments. In scenario 700, training data generator 310 generates rendered PDL 720 by processing an input PDL file and generates related training data item 730 by parsing the input PDL file to determine the values that make up training data item 730. FIG. 7 shows that rendered PDL 720 shows the letters "ABC" in black that are roughly centered on a grey page.

FIG. 7 also shows that training data item 730 provides information about rendered PDL 720 including: rendered PDL 720 has "Text" of "ABC"; a text color of "0, 0, 0, 255" (expressed using CMYK to indicate a black text color), a text font of "Helvetica"; a text font size of "48"; a text bounding box (BBox) of "75, 64, 165, 100", a text rotation of "0" specified in degrees, and a background color expressed in CMYK as "0, 0, 0, 128"; e.g., a grey background.

In scenario 700, a bounding box is specified by two of its four corners: an upper left corner of the bounding box and a lower right corner of the bounding box. Each corner is specified in terms of pixel locations "X Y", where the "X" value is specified in terms of pixels starting with pixel "0" at an upper left hand corner of a page (in this case, the page illustrated by rendered PDL 720) and increasing moving rightward from the upper left corner and where the "Y" value where the "X" value is specified starting with pixel "0" at an upper left hand corner of the page and increasing moving downward from the upper left corner. So, the bounding box specified in training data item 730 "75, 64, 165, 100" has an upper left corner at "75, 64", or 75 pixels right and 64 pixels below the upper left hand corner of the page for rendered PDL 720, and has a lower right cornier at "165, 100" or 165 pixels right and 100 pixels below the upper left hand corner of the page for rendered PDL 720.

Scenario 700 continues with machine learning algorithm 340 being trained based in part on rendered PDL 720 and training data item 730 being provided as inputs during training. After machine learning algorithm 340 is trained, machine learning algorithm 340 is then considered as predictive model 360 and utilized as part of OCR pipeline 500.

Scenario 700 proceeds with OCR pipeline 500 receiving rendered PDL 720 as part of actual input 350. After actual feature vector(s) 352 are generated from actual input 350 and preprocessing 510 of actual input is performed, the preprocessed actual input and actual feature vector(s) 352 are provided to predictive model 360. Predictive model 360 then operates on the preprocessed actual input and actual feature vector(s) 352 as discussed above in the context of OCR pipeline 500 to generate predictive model output 740 of scenario 700 to provide output of text recognized in rendered PDL.

In scenario 700, predictive model output(s) 370 of predictive model 360 are post-processed by post-processing 550 to generate output in a format similar to hOCR. The post-processed output is illustrated in FIG. 7 as predictive model output 740. As with hOCR, predictive model output 740 can indicate paragraph boundaries using a "<p . . . >" (paragraph) tag, such as the "<p class='ocr_par' lang='eng' title='" training1">" shown in FIG. 7 and can illustrate a recognized line of text can be indicated in hOCR using a "<span . . . >" tag with a "class" of "ocr_line".

In the example of predictive model output 740, the span tag is "<span class='ocrx_word' title='bbox 73 62 168 99; x_wconf 93'>ABC</span>", where the class "ocr_word" indicates a span related to a word that has been recognized using OCR and has a "title" with a "bbox" (bounding box) having an upper left hand corner with X Y coordinates of "73 62" and having an upper left hand corner with X Y coordinates of "168 99", a confidence value "x_wconf" of "93" or 93%, and predicted text between the "<span . . . >" and "</span>" of "ABC". In other scenarios, other formats for predictive model outputs are possible as well. After predictive model output 740 is generated, scenario 700 concludes by OCR pipeline 500 providing predictive model output 740 as part of predictive model output(s) 370.

Example Methods of Operation

Figure 8:
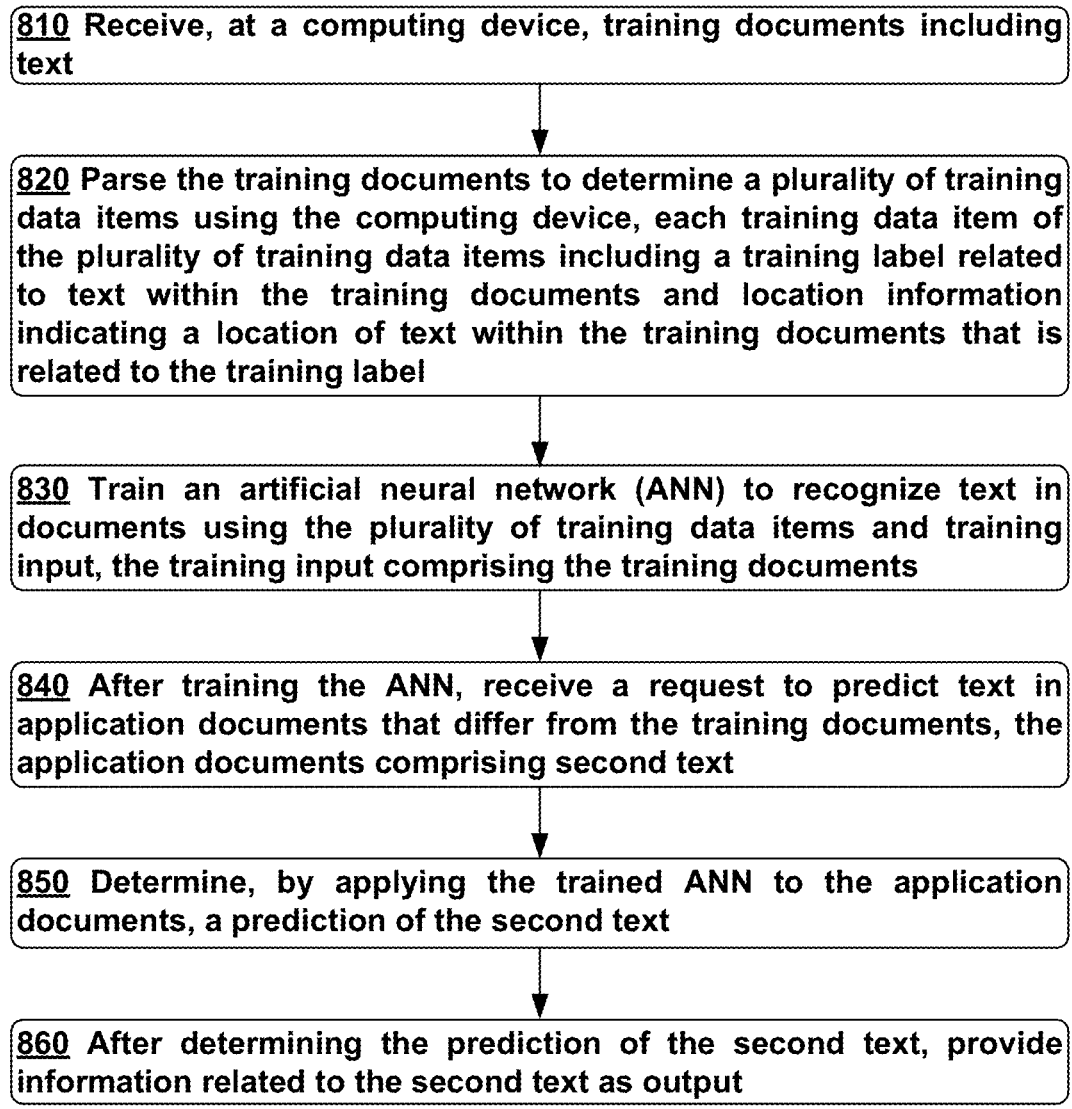
FIG. 8 shows a flowchart for a method, according to example embodiments.

FIG. 8 shows a flowchart for method 800, according to example embodiments. Method 800 can be used for training and utilizing an artificial neural network. Method 800 can be carried out by a computing device, such as computing device 200.

FIG. 8 shows that method 800 can begin at block 810, where the computing device can receive training documents including text, such as discussed herein at least in the context of FIGS. 3, 4, and 7.

At block 820, the computing device can parse the training documents to determine a plurality of training data items using the computing device, each training data item of the plurality of training data items can include a training label related to text within the training documents and location information indicating a location of text within the training documents that is related to the training label; such as discussed herein at least in the context of FIGS. 3, 4, and 7.

At block 830, an ANN can be trained to recognize text in documents using the plurality of training data items and training input, the training input including the training documents, such as discussed herein at least in the context of FIGS. 3, 4, and 7.

At block 840, after training the ANN, a request to predict text in application documents that differ from the training documents can be received, the application documents including second text, such as discussed herein at least in the context of FIG. 5.

At block 850, a prediction of the second text can be determined by applying the trained ANN to the application documents, such as discussed herein at least in the context of FIGS. 5, 6A, 6B, 6C, and 7.

At block 860, after determining the prediction of the second text, information related to the second text can be provided as output, such as discussed herein at least in the context of FIGS. 5 and 7.

In some examples, the training documents can be specified using a PDL, where parsing the training documents to determine the plurality of training data items can include parsing the PDL for the training documents to determine the plurality of training data items, such as discussed herein at least in the context of FIGS. 3 and 4.

In some examples, parsing the PDL for the training documents to determine the plurality of training data items can include parsing the PDL for the training documents to determine location information that can include a bounding box indicating a location of the text within the training documents related to the training label, such as discussed herein at least in the context of FIGS. 3 and 4.

In some examples, training the ANN to recognize text in documents using the plurality of training data items and the training input can include: generating an electronic copy of the training documents using the PDL for the training documents; determining, by applying the trained ANN to the training documents, a prediction of the text of the training documents; and determining accuracy of the prediction of the text of the training documents based on the plurality of training data items, such as discussed herein at least in the context of FIGS. 3 and 4.

In some examples, determining the accuracy of the prediction of the text of the training documents based on the plurality of training data items can include: determining a first training data item of the plurality of training data items, the first training data item can include a first training label related to first text within the training documents and first location information indicating a first location within the training documents of the first text; determining first predicted text at the first location within the prediction of text; and determining the accuracy of the prediction of text of the training documents based on a comparison of the first training label related to the first text to the first predicted text, such as discussed herein at least in the context of FIGS. 3 and 4.

In some examples, determining the accuracy of the prediction of text of the training documents based on the comparison of the first training label related to the first text to the first predicted text can include: determining whether the first text matches the first predicted text; and after determining that the first text matches the first predicted text, increasing the accuracy of the prediction of text, such as discussed herein at least in the context of FIGS. 3 and 4.

In some examples, generating the electronic copy of the training documents using the PDL for the training documents can include generating the electronic copy of the training documents using the PDL for the training documents and one or more data augmentation techniques, such as discussed herein at least in the context of FIGS. 3 and 4.

In some examples, the one or more data augmentation techniques can include one or more of: a technique to skew at least part of the electronic copy of the training documents, a technique to rotate at least part of the electronic copy of the training documents, a technique to introduce noise into at least part of the electronic copy of the training documents, and a technique to filter at least part of the electronic copy of the training documents, such as discussed herein at least in the context of FIGS. 3 and 4.

In some examples, generating the electronic copy of the training documents using the PDL for the training documents can include: printing a paper copy of the training documents, and generating the electronic copy of the training documents by scanning the paper copy of the training documents, such as discussed herein at least in the context of FIGS. 3 and 4.

In some examples, parsing the PDL of the training documents can include: modifying the PDL of the training documents so that the training documents can include at least one of: text utilizing a plurality of different fonts, text utilizing a plurality of different colors, text utilizing a plurality of different sizes, text utilizing a plurality of different styles, and a plurality of pages utilizing a plurality of background colors, such as discussed herein at least in the context of FIGS. 3 and 4.

In some examples, training the ANN to recognize text in documents using the plurality of training data items and training input can include determining a feature vector based on the training input, such as discussed herein at least in the context of FIGS. 3 and 4.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for training and utilizing an artificial neural network (ANN), the method comprising:
   receiving, at a computing device, training documents comprising text, wherein the training documents are specified using a page description language (PDL);
   parsing the PDL for the training documents to determine a plurality of training data items using the computing device, each training data item of the plurality of training data items comprising a training label related to text within the training documents and location information comprising a bounding box indicating a location of text within the training documents that is related to the training label;
   training an ANN to recognize text in documents using the plurality of training data items and training input, the training input comprising the training documents;
   after training the ANN, receiving a request to predict text in application documents that differ from the training documents, the application documents comprising second text;
   determining, by applying the trained ANN to the application documents, a prediction of the second text; and
   after determining the prediction of the second text, providing information related to the second text as output.

2. The method of claim 1, wherein training the ANN to recognize text in documents using the plurality of training data items and the training input comprises:
   generating an electronic copy of the training documents using the PDL for the training documents;
   determining, by applying the trained ANN to the training documents, a prediction of the text of the training documents; and
   determining accuracy of the prediction of the text of the training documents based on the plurality of training data items.

3. The method of claim 2, wherein determining the accuracy of the prediction of the text of the training documents based on the plurality of training data items comprises:
   determining a first training data item of the plurality of training data items, the first training data item comprising a first training label related to first text within the training documents and first location information indicating a first location within the training documents of the first text;
   determining first predicted text at the first location within the prediction of text; and
   determining the accuracy of the prediction of text of the training documents based on a comparison of the first training label related to the first text to the first predicted text.

4. The method of claim 3, wherein determining the accuracy of the prediction of text of the training documents based on the comparison of the first training label related to the first text to the first predicted text comprises:
   determining whether the first text matches the first predicted text; and
   after determining that the first text matches the first predicted text, increasing the accuracy of the prediction of text.

5. The method of claim 2, wherein generating the electronic copy of the training documents using the PDL for the training documents comprises generating the electronic copy of the training documents using the PDL for the training documents and one or more data augmentation techniques.

6. The method of claim 5, wherein the one or more data augmentation techniques comprise one or more of: a technique to skew at least part of the electronic copy of the training documents, a technique to rotate at least part of the electronic copy of the training documents, a technique to introduce noise into at least part of the electronic copy of the training documents, and a technique to filter at least part of the electronic copy of the training documents.

7. The method of claim 2, wherein generating the electronic copy of the training documents using the PDL for the training documents comprises:
   printing a paper copy of the training documents, and
   generating the electronic copy of the training documents by scanning the paper copy of the training documents.

8. The method of claim 7, wherein parsing the PDL of the training documents comprises:
   modifying the PDL of the training documents so that the training documents includes at least one of: text utilizing a plurality of different fonts, text utilizing a plurality of different colors, text utilizing a plurality of different sizes, text utilizing a plurality of different styles, and a plurality of pages utilizing a plurality of background colors.

9. The method of claim 1, wherein training the ANN to recognize text in documents using the plurality of training data items and training input comprises determining a feature vector based on the training input.

10. A computing device, comprising:
    one or more processors; and
    non-transitory data storage storing at least computer-readable instructions that, when executed by the one or more processors, cause the computing device to perform tasks comprising:
    receiving training documents comprising text, wherein the training documents are specified using a page description language (PDL);
    parsing the PDL for the training documents to determine a plurality of training data items, each training data item of the plurality of training data items comprising a training label related to text within the training documents and location information comprising a bounding box indicating a location of text within the training documents that is related to the training label;
    training an artificial neural network (ANN) to recognize text in documents using the plurality of training data items and training input, the training input comprising the training documents;
    after training the ANN, receiving a request to predict text in application documents that differ from the training documents, the application documents comprising second text;
    determining, by applying the trained ANN to the application documents, a prediction of the second text; and
    after determining the prediction of the second text, providing information related to the second text as output.

11. The computing device of claim 10, wherein training the ANN to recognize text in documents using the plurality of training data items comprises:
    generating an electronic copy of the training documents using the PDL for the training documents;
    determining, by applying the trained ANN to the training documents, a prediction of the text of the training documents; and
    determining accuracy of the prediction of the text of the training documents based on the plurality of training data items.

12. The computing device of claim 11, wherein determining the accuracy of the prediction of the text of the training documents based on the plurality of training data items comprises:
    determining a first training data item of the plurality of training data items, the first training data item comprising a first training label related to first text within the training documents and first location information indicating a first location within the training documents of the first text;
    determining first predicted text at the first location within the prediction of text; and
    determining the accuracy of the prediction of text of the training documents based on a comparison of the first training label related to the first text to the first predicted text.

13. The computing device of claim 12, wherein determining the accuracy of the prediction of text in the electronic copy of the training documents based on the comparison of the first training label related to the first text to the first predicted text comprises:
    determining whether the first text matches the first predicted text; and
    after determining that the first text matches the first predicted text, increasing the accuracy of the prediction of text.

14. The computing device of claim 11, wherein generating the electronic copy of the training documents using the PDL for the training documents comprises generating the electronic copy of the training documents using the PDL for the training documents and one or more data augmentation techniques, and wherein the one or more data augmentation techniques comprise one or more of: a technique to skew at least part of the electronic copy of the training documents, a technique to rotate at least part of the electronic copy of the training documents, a technique to introduce noise into at least part of the electronic copy of the training documents, and a technique to filter at least part of the electronic copy of the training documents.

15. The computing device of claim 14, wherein the one or more data augmentation techniques comprise one or more of: a technique to skew at least part of the electronic copy of the training documents, a technique to rotate at least part of the electronic copy of the training documents, a technique to introduce noise into at least part of the electronic copy of the training documents, and a technique to filter at least part of the electronic copy of the training documents.

16. An article of manufacture comprising non-transitory data storage storing at least computer-readable instructions that, when executed by one or more processors of a computing device, cause the computing device to perform tasks comprising:
    receiving training documents comprising text, wherein the training documents are specified using a page description language (PDL);
    parsing the PDL of the training documents to determine a plurality of training data items, each training data item of the plurality of training data items comprising a training label related to text within the training documents and location information comprising a bounding box indicating a location of text within the training documents that is related to the training label;
    training an artificial neural network (ANN) to recognize text in documents using the plurality of training data items and training input, the training input comprising the training documents;

after training the ANN, receiving a request to predict text in application documents that differ from the training documents, the application documents comprising second text;

determining, by applying the trained ANN to the application documents, a prediction of the second text; and after determining the prediction of the second text, providing information related to the second text as output.

* * * * *